(12) United States Patent
Mimori

(10) Patent No.: US 6,952,390 B2
(45) Date of Patent: Oct. 4, 2005

(54) OPTICAL PICKUP APPARATUS, CONDENSING OPTICAL SYSTEM, AND OPTICAL ELEMENT

(75) Inventor: Mitsuru Mimori, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 10/879,917

(22) Filed: Jun. 28, 2004

(65) Prior Publication Data

US 2004/0264348 A1 Dec. 30, 2004

(30) Foreign Application Priority Data

Jun. 30, 2003 (JP) ........................................ 2003-186774

(51) Int. Cl.[7] ................................................. G11B 7/00
(52) U.S. Cl. .............................. 369/112.07; 369/112.08; 369/112.26
(58) Field of Search ....................... 369/112.01, 112.05, 369/112.16, 112.04, 112.12, 112.23, 112.26, 112.15, 112.07, 112.08, 112.24, 112.25, 13.28, 53.2

(56) References Cited

U.S. PATENT DOCUMENTS

| | | | | |
|---|---|---|---|---|
| 6,556,534 B2 | * | 4/2003 | Shimozono | ............ 369/112.26 |
| 6,667,943 B1 | * | 12/2003 | Maruyama et al. | .... 369/112.08 |
| 6,807,139 B2 | * | 10/2004 | Sakamoto | .............. 369/112.07 |

FOREIGN PATENT DOCUMENTS

JP 2001-147367 5/2001
JP 2002-277732 9/2002

* cited by examiner

Primary Examiner—Ali Neyzari
(74) Attorney, Agent, or Firm—Cohen, Pontani, Lieberman & Pavane

(57) ABSTRACT

This invention is directed to an optical pickup apparatus, condensing optical system, and optical element which can at least reproduce and/or record information from/on a first optical information recording medium having a protective substrate thickness t1 by using a light beam of a first wavelength λ1 emitted from a first light source, and reproduce and/or record information from/on a second optical information recording medium having a protective substrate thickness t2 (t2≧t1) by using a light beam of a second wavelength λ2 (λ2>λ1) emitted from a second light source. The optical pickup apparatus of the invention includes a first phase modulator which gives a diffraction effect to only the light beam of the wavelength λ1 on at least one optical surface, of a plurality of optical surfaces of a plurality of optical elements arranged on a common optical path through which the light beam of the first wavelength λ1 and the light beam of the second wavelength λ2 pass, and a second phase modulator which gives a diffraction effect to only the light beam of the wavelength λ2 on at least one of the remaining optical surfaces. Each of the first phase modulator and second phase modulator has staircase-like discontinuous parts, each formed from a predetermined number of stepped portions, formed concentrically around an optical axis at the pitch defined by an optical path difference function.

46 Claims, 19 Drawing Sheets

FIG. 5A
FIG. 5B
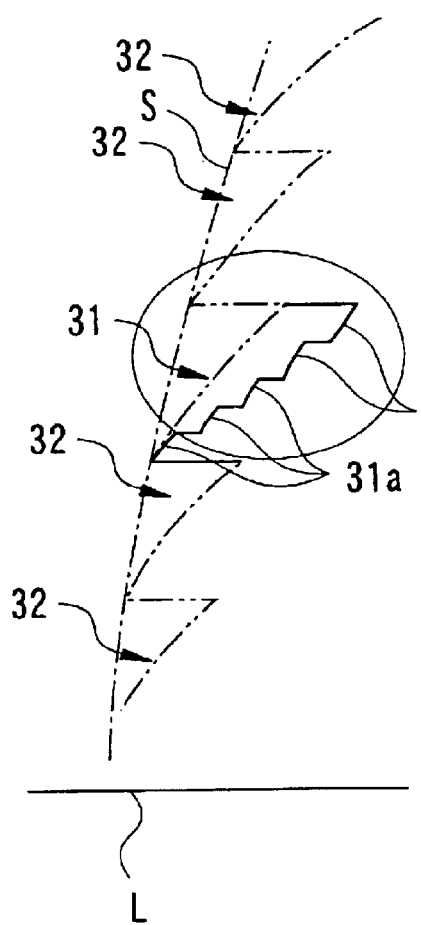
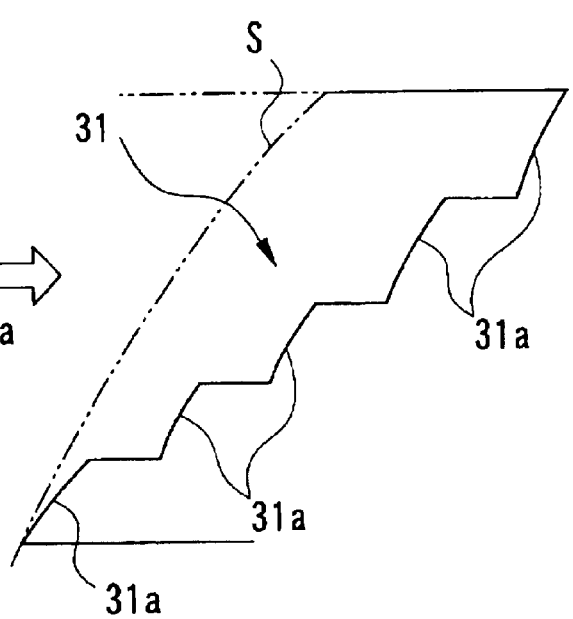

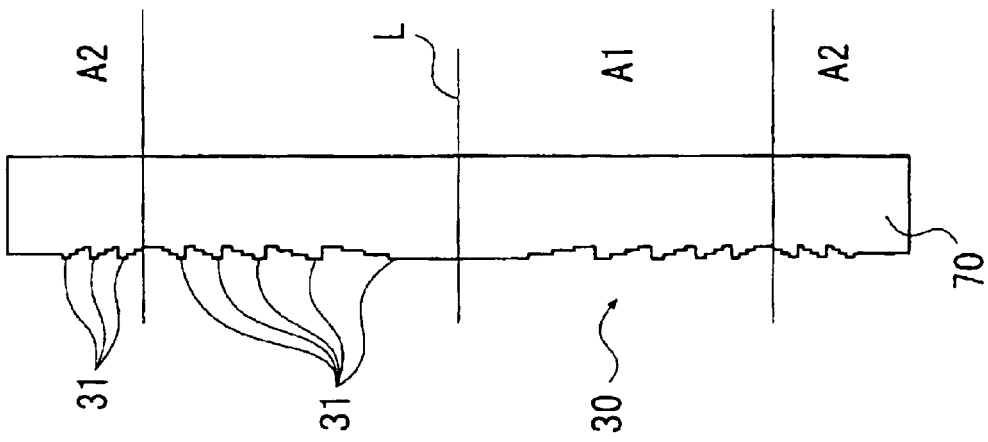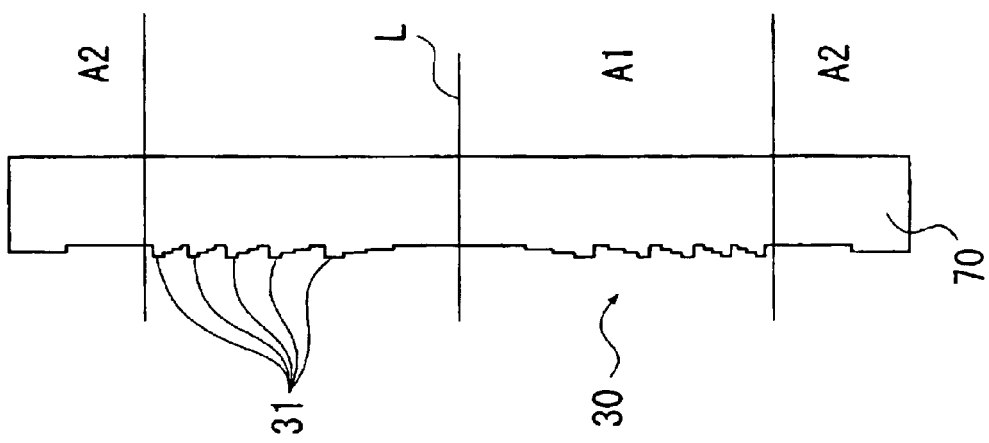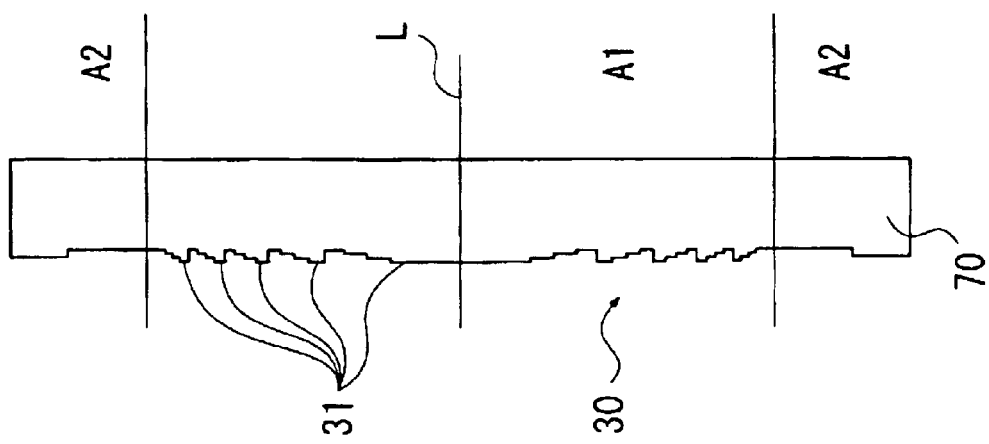

IMAGE HEIGHT CHARACTERISTICS (HD DVD : $\lambda_1$=405nm)

IMAGE HEIGHT CHARACTERISTICS (HD DVD : $\lambda_2$=660nm)

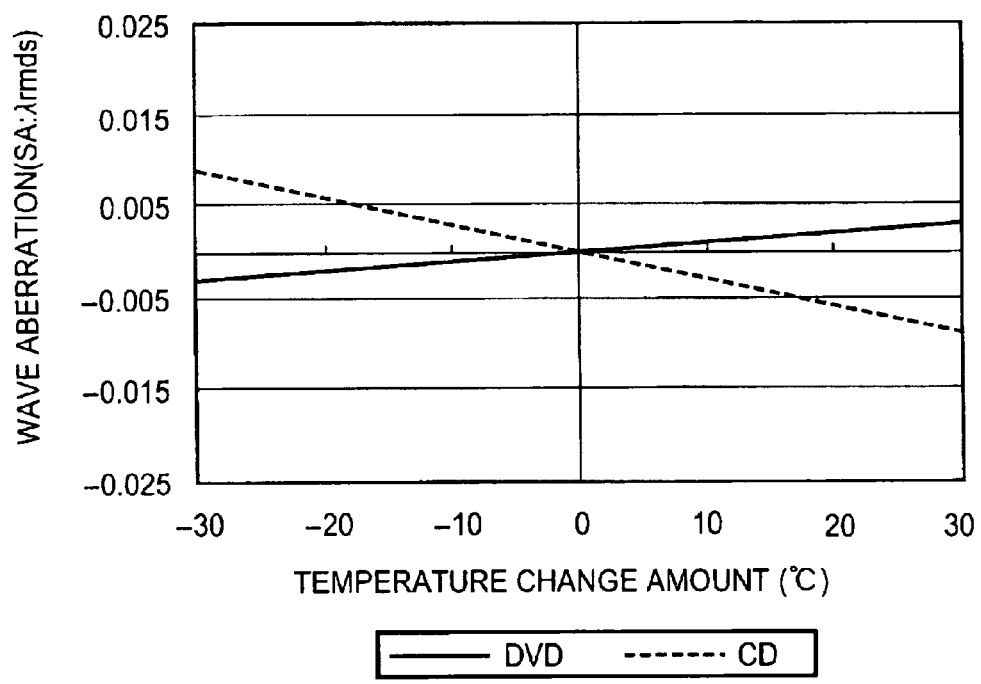

OPTICAL PICKUP APPARATUS, CONDENSING OPTICAL SYSTEM, AND OPTICAL ELEMENT

BACKGROUND OF THE INVENTION

1. Field of the Invention

The present invention relates to an optical pickup apparatus, condensing optical system, and optical element which condense a light beam onto the information recording surface of an optical information recording medium.

2. Description of the Prior Art

Recently, as short-wavelength red lasers have been put into practice, DVDs (Digital Versatile Disks) have been commercially available, which are high-density optical information recording media (also called optical disks) almost equal in size to CDs (Compact Disks) and having large capacities.

In addition to the above CDs and DVDs, optical disks with various specifications which differ in light source wavelength and protective substrate thickness have been commercialized, including a CD-R and RW (rewritable compact disks), VD (Video Disk), MD (Mini Disk), MO (Magneto Optical disk), and the like.

As the wavelengths of semiconductor lasers become shorter, research and development are under way to develop high-density optical disks including, for example, a high-density optical disk (Blue-ray Disc) with a protective substrate thickness of about 0.1 mm which uses a blue-violet semiconductor laser light source having a wavelength of about 400 nm and an objective lens whose image-side numerical aperture (NA) is increased to as large as about 0.85, and a high-density optical disk (HD) with a protective substrate thickness of about 0.6 mm which uses an objective lens having a numerical aperture (NA) of about 0.65. Hereinafter, each of these high-density optical disks is referred to as HD.

There has been proposed an optical pickup apparatus which converges light beams of different wavelengths to the information recording surfaces of a plurality of disks by using one objective lens, i.e., has so-called compatibility.

In general, in an optical pickup apparatus having compatibility, since the respective types of optical information recording media (e.g., a DVD and CD) vary in protective substrate thickness and the wavelength of a light beam to be used, it is difficult to satisfy the sine condition for correcting off-axis coma while correcting spherical aberration and wave aberration for both a DVD and a CD.

In addition, it is difficult to perform "temperature characteristic correction" of correcting a change in the wave aberration of an optical element with a temperature change for the respective types of optical information recording media. Since the wave aberration worsens as the focus position of a condensed light spot deviates due to a change in on-axis chromatic aberration or spherical aberration (chromatic aberration) occurring in an optical element when the wavelength of a light beam changes, it is difficult to perform chromatic aberration correction of correcting the chromatic aberration of an optical element with respect to a change in the wavelength of a light beam for the respective types of information recording media.

Conventionally, an optical pickup apparatus having compatibility has been known, which has a ring-like or grating-like diffraction structure formed on the surface of an objective lens or the surface of an optical element placed separately from the objective lens (see, for example, patent reference 1: Japanese Unexamined Patent Publication No. 2001-147367 and patent reference 2: Japanese Unexamined Patent Publication No. 2002-277732).

The apparatus disclosed in patent reference 1 is designed to perform the above types of correction and the like by using diffracted light beams of the same order obtained by applying the diffraction effects of the diffraction structures provided on the two surfaces of the objective lens to two types of light beams of different wavelengths.

Patent reference 2 discloses an optical pickup apparatus including an objective lens on which a diffraction structure (zone plate) is comprised of stepped portions.

In this apparatus, a diffraction effect is applied to a light beam of a wavelength of 650 nm, of two types of wavelengths, i.e., 650 nm and 780 nm, of light beams collimated by a collimator lens, by using the convex surface shape of an objective lens and the aspherical shapes of the two surfaces of the objective lens, thereby converging the light beam to the recording surface of a DVD. A diffraction effect is applied to a light beam of a wavelength of 780 nm by using the zone plate to converge the light beam to the recording surface of a CD-R in an aberration corrected state. Note that the zone plate has wavelength selectivity and is designed to apply no diffraction effect to a light beam of a wavelength of 650 nm.

In the case of patent reference 1, however, since the same diffraction structure is used for the respective light beams, it is difficult to perform the above independent types of correction for the respective light beams.

In the case of patent reference 2, since the zone plate is configured to apply a diffraction effect to only one light beam while applying no diffraction effect to the other light beam, an aberration correction function obtained by using diffracted light can be provided for only one light beam, and the above respective types of correction and the like using diffracted light cannot be performed for the other light beam. Patent reference 2 also discloses a technique of providing zone plates on the two surfaces, i.e., the incident and exit surfaces, of an objective lens. In this case as well, however, the zone plates on the two surfaces are configured to apply diffraction effects to only one light beam. Therefore, this technique cannot solve the problem of insufficient correction for the other light beam.

SUMMARY OF THE INVENTION

The present invention has been made to solve the above problems, and has as its object to provide an optical pickup apparatus, condensing optical system, and optical element which are used to reproduce and/or record information from/on a plurality of types of optical information recording media of different wavelengths to be used, and can improve off-axis characteristics and correct temperature characteristics and chromatic aberration.

In order to achieve the above object, according to the first aspect of the present invention, there is provided an optical pickup apparatus, comprising: a first light source for emitting a first light beam having a first wavelength $\lambda 1$ to reproduce and/or record information from or onto a first optical information recording medium having a first protective substrate of a first thickness t1; a second light source for emitting a second light beam having a second wavelength $\lambda 2$ ($\lambda 2 > \lambda 1$) to reproduce and/or record information from or onto a second optical information recording medium having a second protective substrate of a second thickness t2 ($t2 \geq t1$); a plurality of optical elements, each of the optical element having a plurality of optical surfaces, wherein the optical elements are arranged on a common optical path through which the first light beam and the second light beam pass; a first phase modulator having discontinuous parts formed periodically and concentrically around an optical axis on at least one of the plurality of optical surfaces, each of the discontinuous parts being formed from a predetermined number of stepped portions, wherein the first phase modulator gives a diffraction effect only to the first light beam; and a second phase modulator having discontinuous parts formed periodically and concentrically around an optical axis on at least one of the remaining optical surfaces, each of the discontinuous parts being formed from a predetermined number of stepped portions, wherein the second phase modulator gives a diffraction effect only to the second light beam.

According to the optical pickup apparatus of the first aspect, it becomes possible to give the diffraction effect to only the first light beam of the wavelength $\lambda 1$ by the first phase modulator and, on the other hand, to give the diffraction effect to only the second light beam of the wavelength $\lambda 2$ by the second phase modulator. In other words, the light beam of the wavelength $\lambda 1$ is not affected by the second phase modulator and, on the other hand, the light beam of the wavelength $\lambda 2$ is not affected by the first phase modulator. Therefore, this makes it possible to give the diffraction effect to each of the light beams having the wavelengths $\lambda 1$ and $\lambda 2$, respectively, independently of each other, thereby improving the off-axis characteristics with respect to each light beam and/or improving the correction function for temperature characteristics and/or the correction function for chromatic aberration.

According to the second aspect of the present invention, in the optical pickup apparatus described in the first aspect, the stepped portions of the first phase modulator are designed to give a phase difference to the first light beam passing through each of the discontinuous parts of the first phase modulator and give no phase difference to the second light beam, and the stepped portions of said second phase modulator are designed to give a phase difference to the second light beam passing through each of the discontinuous parts of the second phase modulator and give no phase difference to the first light beam.

According to the third aspect of the present invention, in the optical pickup apparatus described in the first aspect, the number of discontinuous parts of at least one of the first phase modulator and the second phase modulator falls within a range of 4 to 6.

According to the optical pickup apparatus of the third aspect, this makes it possible to improve the finishing ability of the objective lens and, in addition, to prevent the reduction of light quantity, because the ratio of divergent light, which is incident from a portion (for example, a side surface thereof) except for a surface of staircase-like stepped portions, to total light quantity is suppressed.

According to the fourth aspect of the present invention, in the optical pickup apparatus described in the first aspect, at least one of optical surfaces of the first phase modulator and the second phase modulator comprises at least two areas including a central area containing an optical axis and a peripheral area located on a periphery of the central area, the first light beam passing through the central area is used to reproduce or record information from or on the first optical information recording medium, the second light beam passing through the central area is used to reproduce or record information from or on the second optical information recording medium, and the second light beam passing through the peripheral area is not used for reproducing or recording information from or on the second optical information recording medium and the first light beam passing through the peripheral area is used for reproducing or recording information from or on the first optical information recording medium, or the first light beam passing through the peripheral area is not used for reproducing or recording information from or on the first optical information recording medium and the second light beam passing through the peripheral area is used for reproducing or recording from or on the second optical information recording medium.

According to the optical pickup apparatus of the fourth aspect, it becomes possible to give an objective optical element a function for limiting an aperture with respect to another light beam passing through the peripheral area, because only either one of the light beams respectively having the wavelengths $\lambda 1$ and $\lambda 2$, which pass through the peripheral area, can be used for reproducing and/or recording information from or on a predetermined optical information recording medium.

According to the fifth aspect of the present invention, in the optical pickup apparatus described in the fourth aspect, both the optical surface having the first phase modulator and the optical surface having the second phase modulator comprise the at least two areas.

According to the sixth aspect of the present invention, in the optical pickup apparatus described in the fourth aspect, when the second light beam passing through the peripheral area is not used for reproducing or recording information from or on the second optical information recording medium, the second light beam passing through the peripheral area is condensed at a point other than an information recording surface of the second optical information recording medium, and when the first light beam passing through the peripheral area is not used for reproducing or recording information from or on the first optical information recording medium, the first light beam passing through the peripheral area is condensed at a point other than an information recording surface of the first optical information recording medium.

According to the seventh aspect of the present invention, in the optical pickup apparatus described in the first aspect, the first phase modulator and the second phase modulator are formed on a single optical element of the plurality of optical elements.

According to the eighth aspect of the present invention, in the optical pickup apparatus described in the seventh aspect, the single optical element on which the first phase modulator and the second phase modulator are formed is an objective optical element.

According to the ninth aspect of the present invention, in the optical pickup apparatus described in the first aspect, at least one of the plurality of optical elements is an objective optical element, and an imaging magnification m1 of the single objective optical element with respect to the first light beam and an imaging magnification m2 of the single objective optical element with respect to the second light beam satisfy $-0.005 \leq m1 \leq 0.005$ $-0.005 \leq m2 \leq 0.005$ According to the 10th aspect of the present invention, in the optical pickup apparatus described in the first aspect, at least one of the plurality of optical elements is an objective optical element, and an imaging magnification of the single objective optical element with respect to the first light beam is different from an imaging magnification of the single objective optical element with respect to the second light beam.

According to the 11th aspect of the present invention, in the optical pickup apparatus described in the first aspect, at least one of the plurality of optical elements is an objective optical element, the first light beam of enters as infinite light on the objective optical element, and the second light beam enters as divergent light on the objective optical element.

According to the optical pickup apparatus of the 11th aspect, it becomes possible to suppress the generation amount of spherical aberration as compared with such a case as making the light beam of the wavelength λ2 incident as a parallel beam, because the light beam of the wavelength λ2 is made to be incident as the divergent light on the objective optical element.

According to the 12th aspect of the present invention, in the optical pickup apparatus described in the first aspect, at least one of the plurality of optical elements is an objective optical element, both the first light beam and the second light beam enter as finite light on the objective optical element.

According to the optical pickup apparatus of the 12th aspect, it becomes possible to suppress the generation amount of spherical aberration as compared with such a case as making each of the light beams of the wavelength λ1 and λ2 incident as a parallel beam, because these light beams are made to be incident as the finite light on the objective optical element and, in addition, to downsize the apparatus and reduce a cost thereof as compared with an optical pickup apparatus using infinite light, because it is unnecessary to require an optical element such as, for example, a collimator lens, etc., for making a light beam emitted from the light source incident on the objective optical element after changing the emitted light beam to a parallel light.

According to the 13th aspect of the present invention, in the optical pickup apparatus described in the 12th aspect, an imaging magnification m1 of the single objective optical element with respect to the first light beam and an imaging magnification m2 of the single objective optical element with respect to the second light beam satisfy $$-0.295 \leq m1 \leq -0.049$$

$$-0.295 \leq m2 \leq -0.049$$

According to the optical pickup apparatus of the 13th aspect, it becomes possible to reduce the number of necessary parts for the optical pickup apparatus, because it can be unnecessary to require a coupling lens. Further, it is preferable that m1 is within a range of $-0.15 \leq m1 \leq -0.01$, and that m2 is within a range of $-0.15 \leq m2 \leq -0.01$.

According to the 14th aspect of the present invention, in the optical pickup apparatus described in the first aspect, $$600 \text{ nm} \leq \lambda1 \leq 700 \text{ nm}$$

$$750 \text{ nm} \leq \lambda2 \leq 850 \text{ nm}$$

are satisfied.

According to the optical pickup apparatus of the 14th aspect, this makes it possible to obtain the optical pickup apparatus having the interchangeability between DVD/CD.

According to the 15th aspect of the present invention, in the optical pickup apparatus described in the first aspect, $$350 \text{ nm} \leq \lambda1 \leq 450 \text{ nm}$$

$$600 \text{ nm} \leq \lambda2 \leq 700 \text{ nm}$$

are satisfied.

According to the optical pickup apparatus of the 15th aspect, this makes it possible to obtain the optical pickup apparatus having the interchangeability between HD/DVD.

According to the 16th aspect of the present invention, in the optical pickup apparatus described in the first aspect, the optical surface having the first phase modulator is located closer to a light source side than the optical surface having the second phase modulatr.

According to the 17th aspect of the present invention, in the optical pickup apparatus described in the first aspect, at least one of the first phase modulator and the second phase modulator acts to reduce spherical aberration on an information recording surface of an optical information recording medium caused by a change in ambient temperature.

According to the optical pickup apparatus of the 17th aspect, in the optical pickup apparatus having the interchangeability among three optical information recording mediums, for example, HD/DVD/CD, it becomes possible to give the diffraction effect to at least two kinds of light beams independently of each other, thereby improving the off-axis characteristics with respect to these light beams and improving the correction function for temperature characteristics and chromatic aberration also.

According to the 18th aspect of the present invention, in the optical pickup apparatus described in the first aspect, at least one of the first phase modulator and the second phase modulator acts to reduce spherical aberration on an information recording surface of an optical information recording medium caused by a change in wavelength with respect to at least one of the first light beam and the second light beam.

According to the 19th aspect of the present invention, in the optical pickup apparatus described in the first aspect, further comprising a third light source for emitting a third light beam of a third wavelength λ3 (λ3<λ1) to record and/or reproduce information from or onto a third optical information recording medium having a third protective substrate of a third thickness t3 (t3≦t1)

According to the 20th aspect of the present invention, there is provided a condensing optical system for an optical pickup apparatus, comprising: a plurality of optical elements having a plurality of optical surfaces; a first phase modulator having discontinuous parts formed periodically and concentrically around an optical axis on at least one of the plurality of optical surfaces, each of the discontinuous parts being formed from a predetermined number of stepped portions, wherein in case that a first light beam having a first wavelength λ1 for reproducing and/or recording information from or onto a first optical information recording medium having a first protective substrate of a first thickness t1 and a second light beam having a second wavelength λ2 (λ2>λ1) for recording and/or reproducing information form or onto a second optical information recording medium having a second protective substrate of a second thickness t2 (t2≧t1), pass through the first phase modulator, the first phase modulator gibes a diffraction effect only to the first light beam; and a second phase modulator having discontinuous parts formed periodically and concentrically around an optical axis on at least one of the remaining optical surfaces, each of the discontinuous parts being formed from a predetermined number of stepped portion, wherein in case that the first light beam and the second light beam pass through the second phase modulator, the second phase modulator gives a diffraction effect only to the second light beam; wherein the plurality of optical elements are arranged on a common optical path in the optical pickup apparatus through which the first light beam and the second light beam pass.

According to the optical pickup apparatus of the 20th aspect, it becomes possible to give the diffraction effect to only the light beam of the wavelength λ1 by the first phase modulator and, on the other hand, to give the diffraction effect to only the light beam of the wavelength λ2 by the second phase modulator. In other words, the light beam of the wavelength λ1 is not affected by the second phase modulator and, on the other hand, the light beam of the wavelength λ2 is not affected by the first phase modulator. Therefore, this makes it possible to give the diffraction effect to each of the light beams having the wavelengths λ1 and λ2, respectively, independently of each other, thereby improving the off-axis characteristics with respect to each light beam and improving the correction function for temperature characteristics and chromatic aberration also.

According to the 21st aspect of the present invention, in the condensing optical system described in the 20th aspect, the stepped portions of the first phase modulator are designed to give a phase difference to the first light beam passing through each of the discontinuous parts of the first phase modulator and give no phase difference to the second light beam, and the stepped portions of said second phase modulator are designed to give a phase difference to the second light beam passing through each of the discontinuous parts of the second phase modulator and give no phase difference to the light beam of the wavelength λ1

According to the 22nd aspect of the present invention, in the condensing optical system described in the 20th aspect, the number of discontinuous parts of at least one of the first phase modulator and the second phase modulator falls within a range of 4 to 6.

According to the optical pickup apparatus of the 22nd aspect, this makes it possible to improve the finishing ability of the objective lens and, in addition, to prevent the reduction of light quantity, because the ratio of divergent light, which is incident from a portion (for example, a side surface thereof) except for a surface of staircase-like stepped portions, to total light quantity is suppressed.

According to the 23rd aspect of the present invention, in the condensing optical system described in the 20th aspect, at least one of optical surfaces of the first phase modulator and the second phase modulator comprises at least two areas including a central area containing an optical axis and a peripheral area located on a periphery of the central area, the first light beam passing through the central area is used to reproduce or record information from or on the first optical information recording medium, the second light beam passing through the central area is used to reproduce or record information from or on the second optical information recording medium, and the second light beam passing through the peripheral area is not used for reproducing or recording information from or on the second optical information recording medium and the first light beam passing through the peripheral area is used for reproducing or recording information from or on the first optical information recording medium, or the first light beam passing through the peripheral area is not used for reproducing or recording information from or on the first optical information recording medium and the second light beam passing the peripheral area is used for reproducing or recording from or on the second optical information recording medium.

According to the optical pickup apparatus of the 23rd aspect, it becomes possible to give an objective optical element a function for limiting an aperture with respect to another light beam passing through the peripheral area, because only either one of the light beams having the wavelengths λ1 and λ2, respectively, which pass through the peripheral area can be used for reproducing and/or recording information from or on a predetermined optical information recording medium.

In the 24th aspect of the present invention, in the condensing optical system described in the 23rd aspect, both the optical surface having the first phase modulator and the optical surface having the second phase modulator comprise the at least two areas.

According to the 25th aspect of the present invention, in the condensing optical system described in the 23rd aspect, when the second light beam passing through the peripheral area is not used for reproducing or recording information from or on the second optical information recording medium, the second light beam passing through the peripheral area is condensed at a point other than an information recording surface of the second optical information recording medium, and when the first light beam passing through the peripheral area is not used for reproducing or recording information from or on the first optical information recording medium, the light first beam passing through the peripheral area is condensed at a point other than the information recording surface of the first optical information recording medium.

According to the optical pickup apparatus of the 25th aspect, this makes it possible to collect either one of the light beams respectively having the wavelengths λ1 and λ2, which pass through the peripheral area, on an information recording surface of a predetermined optical information recording medium and the other light beam (for example, the light beam having the wavelength λ2 used for CD) on an information recording surface of the CD. Therefore, in case of reproducing and/or recording information from or on the CD, it becomes possible to limit numerical aperture without using a member such as, for example, an aperture limiting filter, etc., thereby enabling to reduce the number of necessary parts.

According to the 26th aspect of the present invention, in the condensing optical system described in the 20th aspect, the first phase modulator and the second phase modulator are formed on a single optical element of the plurality of optical elements.

According to the 27th aspect of the present invention, in the condensing optical system described in the 26th aspect, the single optical element on which the first phase modulator and the second phase modulator are formed is an objective optical element for the optical pickup apparatus.

According to the 28th aspect of the present invention, in the condensing optical system described in the 20th aspect, $600 \text{ nm} \leq \lambda1 \leq 700 \text{ nm}$ $750 \text{ nm} \leq \lambda2 \leq 850 \text{ nm}$ are satisfied.

According to the optical pickup apparatus of the 28th aspect, this makes it possible to obtain the optical pickup apparatus having the interchangeability between DVD/CD.

According to the 29th aspect of the present invention, in the condensing optical system described in the 20th aspect, $350 \text{ nm} \leq \lambda1 \leq 450 \text{ nm}$ $600 \text{ nm} \leq \lambda2 \leq 700 \text{ nm}$ are satisfied.

According to the optical pickup apparatus of the 29th aspect, this makes it possible to obtain the optical pickup apparatus having the interchangeability between HD/DVD.

According to the 30th aspect of the present invention, in the condensing optical system described in the 20th aspect, the optical surface having the first phase modulator is located closer to a light source side than the optical surface having the second phase modulator unit.

According to the 31st aspect of the present invention, in the condensing optical system described in the 20th aspect, at least one of the first phase modulator and the second phase modulator acts to reduce spherical aberration on an information recording surface of an optical information recording medium caused by a change in ambient temperature.

According to the 32nd aspect of the present invention, in the condensing optical system described in the 20th aspect, at least one of the first phase modulator and the second phase modulator acts to reduce spherical aberration on an information recording surface of an optical information recording medium caused by a change in wavelength with respect to at least one of the first light beam and the second light beam.

According to the 33rd aspect of the present invention, in the condensing optical system described in the 20th aspect, information can be played back and/or recorded from/on a third optical information recording medium with a protective substrate thickness t3 (t3≦t1) by using a light beam of a third wavelength λ3 (λ3<λ1) emitted from a third light source.

According to the optical pickup apparatus of the 33rd aspect, in the optical pickup apparatus having the interchangeability among three optical information recording mediums, for example, HD/DVD/CD, it becomes possible to give the diffraction effect to at least two kinds of light beams independently of each other, thereby improving the off-axis characteristics with respect to these light beams and improving the correction function for temperature characteristics and chromatic aberration also.

According to the 34th aspect of the present invention, there is provided an optical element for an optical pickup apparatus for recording and/or reproducing information from or onto an optical information recording medium, comprising: a first phase modulator formed on one optical surface, for giving a diffraction effect, wherein in case that a first light beam having a first wavelength λ1 for reproducing and/or recording information from or onto a first optical information recording medium having a first protective substrate of a first thickness t1 and a second light beam having a second wavelength λ2 (λ2>λ1) for recording and/or reproducing information form or onto a second optical information recording medium having a second protective substrate of a second thickness t2 (t2≧t1), pass through the first phase modulator, the first phase modulator gives the diffraction effect only to the first light beam; and a second phase modulator formed on the other optical surface, for giving a diffraction effect, wherein in case that the first light beam and the second light beam pass through the second phase modulator the second phase modulator gives the diffraction effect only to the second light beam; wherein the optical element is arranged on a common optical path in the optical pickup apparatus through which the first light beam and the second light beam pass.

According to the optical pickup apparatus of the 34th aspect, it becomes possible to give the diffraction effect to only the light beam of the wavelength λ1 by the first phase modulator and, on the other hand, to give the diffraction effect to only the light beam of the wavelength λ2 by the second phase modulator. In other words, the light beam of the wavelength λ1 is not affected by the second phase modulator and, on the other hand, the light beam of the wavelength λ2 is not affected by the first phase modulator. Therefore, this makes it possible to give the diffraction effect to each of the light beams having the wavelengths λ1 and λ2, respectively, independently of each other, thereby improving the off-axis characteristics with respect to each light beam and improving the correction function for temperature characteristics and chromatic aberration also.

According to the 35th aspect of the present invention, in the optical element described in the 34th aspect, the first phase modulator has discontinuous parts formed periodically and concentrically around an optical axis on the one optical surface, each of the discontinuous parts being formed from a predetermined number of stepped portions, a second phase modulator having discontinuous parts formed periodically and concentrically around an optical axis on the other optical surface, each of the discontinuous parts being formed from a predetermined number of stepped portions, the stepped portions of the first phase modulator are designed to give a phase difference to the first light beam passing through each of the discontinuous parts of the first phase modulator and give no phase difference to the second light beam, and the stepped portions of said second phase modulator are designed to give a phase difference to the second light beam passing through each of the discontinuous parts of the second phase modulator and give no phase difference to the first light beam.

According to the 36th aspect of the present invention, in the optical element described in the 34th aspect, the number of discontinuous parts of at least one of the first phase modulator and the second phase modulator falls within a range of 4 to 6.

According to the optical pickup apparatus of the 36th aspect, this makes it possible to improve the finishing ability of the objective lens and, in addition, to prevent the reduction of light quantity, because the ratio of divergent light, which is incident from a portion (for example, a side surface thereof) except for a surface of staircase-like stepped portions, to total light quantity is suppressed.

According to the 37th aspect of the present invention, in the optical element described in the 34th aspect, at least one of optical surfaces of the first phase modulator and the second phase modulator comprises at least two areas including a central area containing an optical axis and a peripheral area located on a periphery of the central area, the first light beam passing through the central area is used to reproduce or record information from or on the first optical information recording medium, the second light beam passing through the central area is used to reproduce or record information from or on the second optical information recording medium, and the second light beam passing through the peripheral area is not used for reproducing or recording information from or on the second optical information recording medium and the first light beam passing through the peripheral aria is used for reproducing or recording information from or on the first optical information recording medium, or the first light beam passing through the peripheral area is not used for reproducing or recording information from or on the first optical information recording medium and the second light beam passing through the peripheral area is used for reproducing or recording from or on the second optical information recording medium.

According to the optical pickup apparatus of the 37th aspect, it becomes possible to give an objective optical element a function for limiting an aperture with respect to another light beam passing through the peripheral area, because only either one of the light beams having the wavelengths λ1 and λ2, respectively, which pass through the peripheral area can be used for reproducing and/or recording information from or on a predetermined optical information recording medium.

According to the 38th aspect of the present invention, in the optical element described in the 37th aspect, both the optical surface having the first phase modulator and the optical surface having the second phase modulator comprise the at least two areas.

According to the 39th aspect of the present invention, in the optical element described in the 37th aspect, when the second light beam passing through the peripheral area is not used for reproducing or recording information from or on the second optical information recording medium, the second light beam passing through the peripheral area is condensed at a point other than an information recording surface of the second optical information recording medium, and when the first light beam passing through the peripheral area is not used for reproducing or recording information from or on the first optical information recording medium, the first light beam passing through the peripheral area is condensed at a point other than an information recording surface of the first optical information recording medium.

According to the optical pickup apparatus of the 39th aspect, this makes it possible to collect either one of the light beams respectively having the wavelengths $\lambda 1$ and $\lambda 2$, which pass through the peripheral area, on an information recording surface of a predetermined optical information recording medium and the other light beam (for example, the light beam having the wavelength $\lambda 2$ used for CD) on an information recording surface of the CD. Therefore, in case of reproducing and/or recording information from or on the CD, it becomes possible to limit numerical aperture without using a member such as, for example, an aperture limiting filter, etc., thereby enabling to reduce the number of necessary parts.

According to the 40th aspect of the present invention, in the optical element described in the 34th aspect, the optical element is an objective optical element for the optical pickup apparatus.

According to the 41st aspect of the present invention, in the optical element described in the 34th aspect, $$600 \text{ nm} \leq \lambda 1 \leq 700 \text{ nm}$$

$$750 \text{ nm} \leq \lambda 2 \leq 850 \text{ nm}$$

are satisfied.

According to the optical pickup apparatus of the 41st aspect, this makes it possible to obtain the optical pickup apparatus having the interchangeability between DVD/CD.

According to the 42nd aspect of the present invention, in the optical element described in the 34th aspect, $$350 \text{ nm} \leq \lambda 1 \leq 450 \text{ nm}$$

$$600 \text{ nm} \leq \lambda 2 \leq 700 \text{ nm}$$

are satisfied.

According to the optical pickup apparatus of the 42nd aspect, this makes it possible to obtain the optical pickup apparatus having the interchangeability between HD/DVD.

According to the 43rd aspect of the present invention, in the optical element described in the 34th aspect, the optical surface having the first phase modulator is located closer to a light source side than the optical surface having the second phase modulator.

According to the 44th aspect of the present invention, in the optical element described in the 34th aspect, at least one of the first phase modulator and the second phase modulator acts to reduce spherical aberration on an information recording surface of an optical information recording medium caused by a change in ambient temperature.

According to the 45th aspect of the present invention, in the optical element described in the 34th aspect, at least one of the first phase modulator and the second phase modulator acts to reduce spherical aberration on an information recording surface of an optical information recording medium caused by a change in wavelength with respect to at least one of the first light beam and the second light beam.

According to the 46th aspect of the present invention, in the optical element described in the 34th aspect, the optical pickup apparatus further comprises a third light source for emitting a third light beam of a third wavelength $\lambda 3$ ($\lambda 3 < \lambda 1$) to record and/or reproduce information from or onto a third optical information recording medium having a third protective substrate of a third thickness t3 ($t3 \leq t1$).

According to the optical pickup apparatus of the 46th aspect, in the optical pickup apparatus having the interchangeability among three optical information recording mediums, for example, HD/DVD/CD, it becomes possible to give the diffraction effect to at least two kinds of light beams independently of each other, thereby improving the off-axis characteristics with respect to these light beams and improving the correction function for temperature characteristics and chromatic aberration also.

As is obvious from the respective aspects described above, according to the present invention, since a light beam of the wavelength $\lambda 1$ is not influenced by the second phase modulator, and a light beam of the wavelength $\lambda 2$ is not influenced by the first phase modulator, a diffraction effect can be independently applied to a light beam of each wavelength. This makes it possible to improve the off-axis characteristics with respect to each light beam and improve the correction function for temperature characteristics and chromatic aberration.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 5A and 5B are enlarged views each showing the main part of the arrangement of a phase modulator;

FIGS. 8a to 8C are plan views each showing an optical element having a phase modulator;

FIG. 18 is a graph showing the temperature characteristics of the third embodiment of the present invention;

DETAILED DESCRIPTION OF THE PREFERRED EMBODIMENTS

Several exemplified modes associated with the optical pickup apparatus, condensing optical system, and optical element of the present invention will be described below with reference to the accompanying drawings.

In the description of this specification, it should be noted that an optical element indicates a member such as, for example, a coupling lens, beam expander, beam shaper or corrector plate, etc., which is composed of a condensing optical system in an optical pickup apparatus.

The optical element is not restricted to that constructed by only a single lens, but includes a group of lenses (a cemented doublet) in which a plurality of lenses are combined in the optical axis direction.

A optical information recording medium indicates a general optical disk such as, for example, CD, DVD, CD-R, MD, MO, HD, etc., which can perform to reproduce and/or record information with making use of a light beam having a predetermined wavelength.

A discontinuous part is in such a structure as, in a cross sectional view cut by a plane including the optical axis (meridional plane), being formed from a staircase-like stepped portion having a predetermined number of stepped portions extending along the optical axis direction and having a diffraction function for a predetermined light beam, which passes through the discontinuous part, by providing a phase difference for the passing light beam.

In the description of this specification, the phase difference $\phi$ is within a range of $0 \leq \phi < 2\pi$ or $-\pi \leq \phi < \pi$.

In addition, an infinite order number of diffraction beams such as, for example, 0 order's diffraction beam, ±1 order's diffraction beam, ±2 order's diffraction beam, etc., are generated from the optical surface on which the phase modulator is formed. According to the present invention, it becomes possible to raise diffraction efficiencies of particular orders' diffraction beams more than those of other orders' diffraction beams and, when occasion demands, to make a diffraction efficiency of a particular order's diffraction beam (for example, +1 order's diffraction beam) 100%.

Further, the diffraction efficiency represents a light quantity ratio of the diffraction beam generated by the provision of the discontinuous part. The sum of diffraction efficiencies in all orders' diffraction beams becomes 1.

Figure 1:
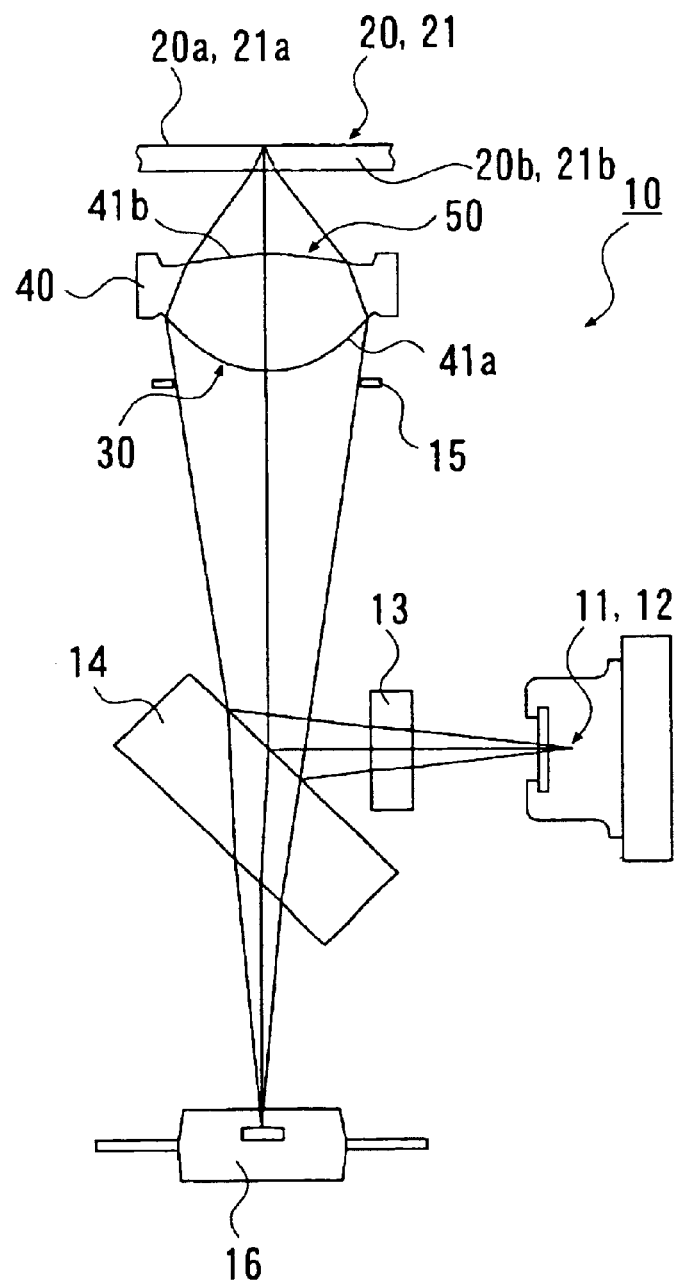
FIG. 1 is a plan view showing an example of the arrangement of an optical pickup apparatus.

As shown in FIG. 1, an optical pickup apparatus 10 outputs a light beam of wavelength $\lambda 1$ (600 nm $\leq \lambda 1 \leq$ 700 nm, for example, 650 nm) from a first semiconductor laser 11 (first light source) to a first optical information recording medium 20 (a DVD in this exemplified mode), and outputs a light beam of wavelength $\lambda 2$ (750 nm $\leq \lambda 1 \leq$ 850 nm, for example, 780 nm) from a second semiconductor laser 12 (second light source) to a second optical information recording medium 21 (a CD in this exemplified mode). These light beams are then caused to be incident as divergent light on an objective lens 40 (objective optical element) serving as an optical element and including a first phase modulator and second phase modulator, and are condensed onto information recording surfaces 20a and 21a of predetermined optical information recording media, thereby recording various kinds of information and reading recorded information.

Figure 2:
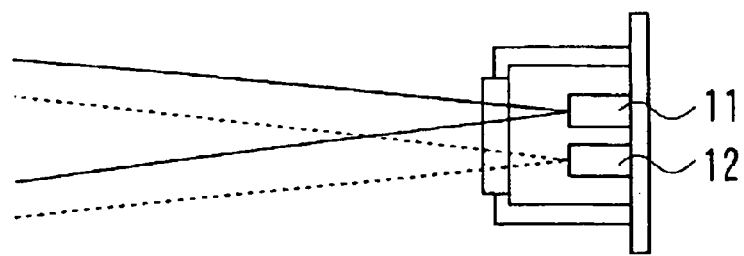
FIG. 2 is a plan view showing the arrangement of a light source.

As shown in FIG. 2, the first semiconductor laser 11 and second semiconductor laser 12 are integrated into a unit as a light source. Assume therefore that a light beam of a wavelength $\lambda 1$ and a light beam of a wavelength $\lambda 2$ emitted from the respective semiconductor lasers are expressed together by a solid line, as shown in FIG. 1.

When information is to be recorded on or played back from a DVD, the light beam of the wavelength $\lambda 1$ emitted from the first semiconductor laser 11 passes through a diffraction grating 13 and is reflected by a half mirror 14. The light beam is limited by a stop 15 and condensed onto the information recording surface 20a through a protective substrate 20b of the DVD. The effect of the objective lens 40 on the light beam of the wavelength $\lambda 1$ at this time will be described later.

The light beam modulated and reflected by an information pit of the information recording surface 20a passes through the objective lens 40, stop 15, and half mirror 14 again, and passes through a diffraction grating (not shown) to strike a photodetector 16. A read signal of information recorded on the DVD is obtained by using the signal output from the photodetector 16.

When information is to be recorded on or played back from a CD, the light beam of the wavelength $\lambda 2$ emitted from the second semiconductor laser 12 also passes through the diffraction grating 13 and is reflected by the half mirror 14. The light beam is then limited by the stop 15 and condensed onto the information recording surface 21a through a protective substrate 21b of the CD. For the sake of convenience, FIG. 1 shows the protective substrate 21b of the CD and the protective substrate 20b of the DVD with the same thickness. The effect of the objective lens 40 on the light beam of the wavelength $\lambda 2$ at this time will be described later.

The light beam modulated and reflected by an information pit of the information recording surface 21a passes through the objective lens 40, stop 15, and half mirror 14, and passes through the diffraction grating (not shown) to strike the photodetector 16. A read signal of information recorded on the CD is obtained by using the signal output from the photodetector 16.

In addition, focus detection and track detection are performed by detecting a change in the shape of a spot on the photodetector 16 and a change in light amount due to a change in position. On the basis of the detection result, a two-dimensional actuator (not shown) moves the objective lens 40 such that a light beam from the first semiconductor laser 11 or second semiconductor laser 12 is formed into an image on the information recording surface 20a or 21a of the DVD or CD, and also moves the objective lens 40 to form the light beam into an image on a predetermined track.

In this exemplified mode, a condensing optical system is comprised of the diffraction grating 13 and objective lens 40.

Figure 3:
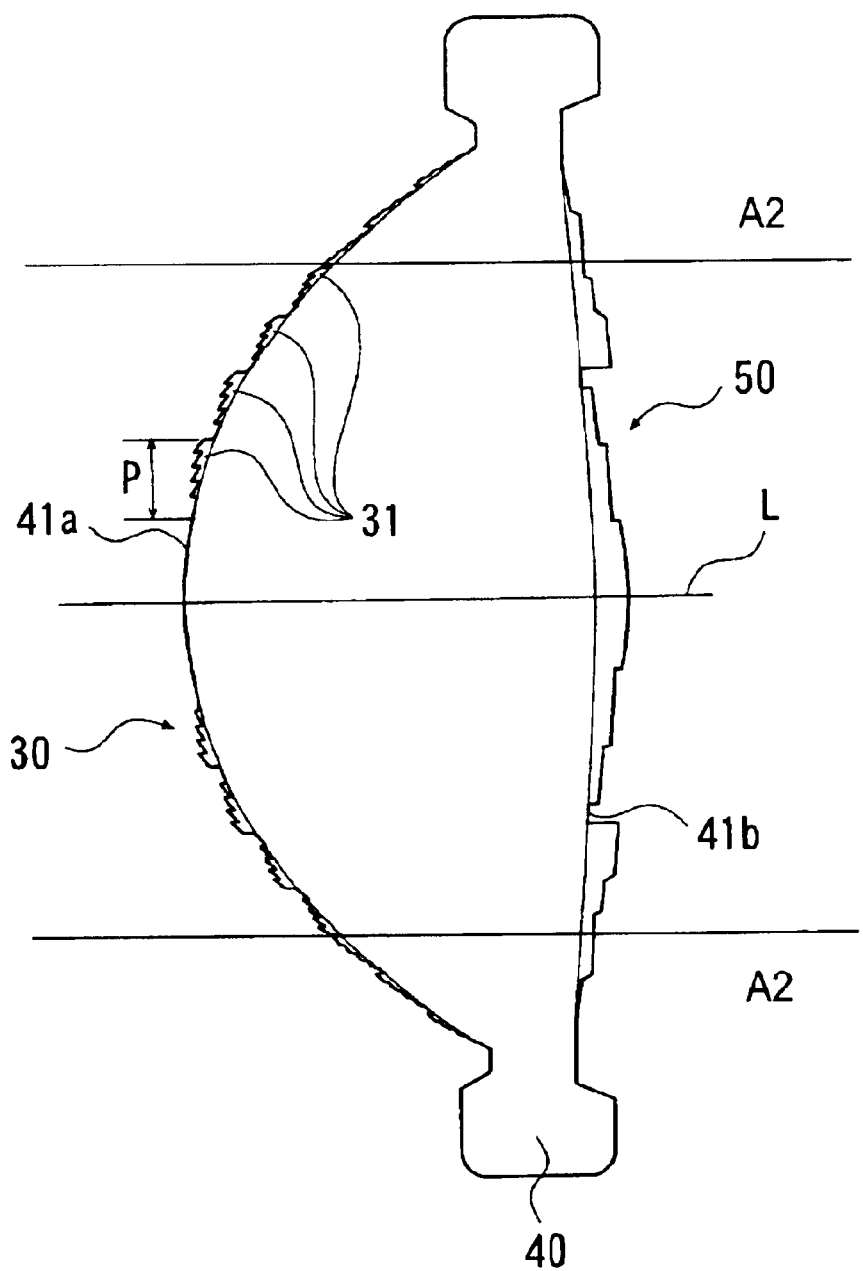
FIG. 3 is a plan view showing the arrangement of an objective lens.

As shown in FIG. 3, the objective lens 40 is a single lens with two aspherical surfaces which forms the condensing optical system of the optical pickup apparatus 10. A first phase modulator 30 is provided on one (on the light source side) optical surface 41a of the objective lens 40, and a second phase modulator 50 is provided on the other (on the optical information recording medium side) optical surface 41b of the objective lens 40.

Figure 4A:
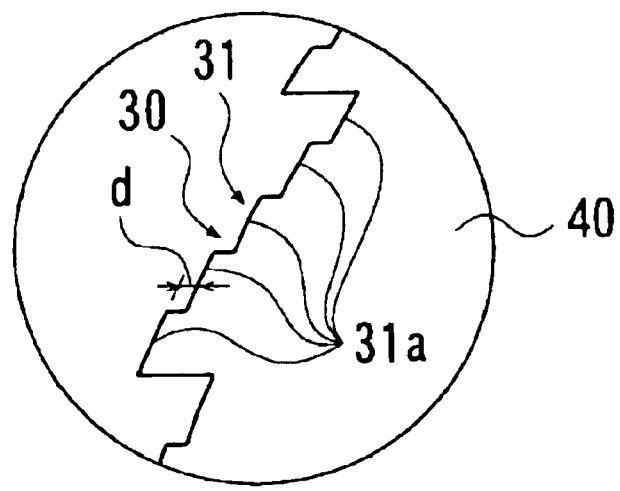
FIGS. 4A to 4C are enlarged views each showing the main part of the arrangement of a phase modulator.

More specifically, as shown in FIG. 4A, as the first phase modulator 30, staircase-like discontinuous parts 31, each comprised of a predetermined number of stepped portions 31a formed along the direction of an optical axis L, are formed concentrically around the optical axis L at the pitch defined by an optical path difference function (to be described later).

Each discontinuous part 31 is comprised of five stepped portions 31a formed along the direction of the optical axis L. The stepped portions 31a are arranged to protrude forward with a decrease in distance to the optical axis L.

Although the number of stepped portions 31a constituting one discontinuous part 31 is preferably five or six (the number of steps of one discontinuous part is four or five), it suffices if this number falls within the range of four to seven. In addition, the respective discontinuous parts 31 may be comprised of different numbers of stepped portions 31a.

In this exemplified mode, as shown in FIG. 3, the four discontinuous parts 31 of the first phase modulator 30 are formed concentrically around the optical axis L at a pitch P given by an optical path difference function.

The amount of phase difference provided for the first wavelength $\lambda 1$ and second wavelength $\lambda 2$ can be adjusted by adjusting the distance between the plurality of stepped portions 31a constituting one discontinuous part 31, i.e., a depth d of one step of the continuous stepped portions 31a (see FIG. 4A). In the present invention, the shape of the stepped portions of each discontinuous part 31 of the first phase modulator 30 is designed to provide a phase difference for the passing light beam of the wavelength $\lambda 1$ and provide no phase difference for the passing light beam of the wavelength $\lambda 2$. Note that a method of designing the discontinuous parts 31 has been conventionally known, and hence a description thereof will be omitted.

Like the first phase modulator 30, the second phase modulator 50 has staircase-like discontinuous parts 31, each formed from a predetermined number stepped portions 31a along the direction of the optical axis L, formed concentrically around the optical axis L at a predetermined pitch.

The shape of the stepped portions of each discontinuous part 31 of the second phase modulator 50 is designed to provide a phase difference for a passing light beam of the wavelength $\lambda 2$ and provide no phase difference for a passing light beam of the wavelength $\lambda 1$.

The number of discontinuous parts constituting each of the first phase modulator 30 and second phase modulator 50 preferably falls within the range of four to six. This makes it possible to improve the workability of the objective lens 40 and suppress the ratio of the amount of divergent light, of the divergent light incident on each discontinuous part 31, which is incident from a portion (e.g., a side surface) other than the surface (optical function surface) of the stepped portions 31a to the total amount of light, thereby preventing a reduction in light amount.

The effects of the objective lens 40 on a light beam of the wavelength $\lambda 1$ and a light beam of the wavelength $\lambda 2$ will be described next.

When divergent light of the wavelength $\lambda 1$ is incident on the objective lens 40, the light beam of the wavelength $\lambda 1$ is subjected to the refraction effect produced by the aspherical shape of the incident surface 41a and is also subjected to a diffraction effect by being provided with a predetermined phase difference by the first phase modulator 30. The light beam of the wavelength $\lambda 1$ then reaches the exit surface 41b. As described above, since the light beam is provided with no phase difference from the second phase modulator 50 formed on the exit surface 41b, the light beam emerges from the exit surface 41b upon being subjected to only the refraction effect produced by the aspherical shape of the exit surface 41b. The emerging light beam of the wavelength $\lambda 1$ is condensed onto the information recording surface 20a of the DVD and used to record or reproduce information on or from the DVD.

When divergent light of the wavelength $\lambda 2$ is incident on the objective lens 40, the light beam is provided with no phase difference from the first phase modulator 30 formed on the incident surface 41a as described above, and reaches the exit surface upon being subjected to only the refraction effect produced by the aspherical shape of the incident surface 41a. The light beam of the wavelength $\lambda 2$ is then subjected to the refraction effect produced by the aspherical shape of the exit surface 41b and provided with a predetermined phase difference from the second phase modulator 50. As a consequence, the light beam is subjected to a refraction effect and emerges from the exit surface 41b. The light beam of the wavelength $\lambda 2$ is condensed onto the protective substrate 20b and used to record or reproduce information on or from the CD.

As described above, according to the exemplified mode of the present invention, a light beam of the wavelength $\lambda 1$ is provided with a diffraction effect by only the first phase modulator 30, whereas a light beam of the wavelength $\lambda 2$ is provided with a diffraction effect from only the second phase modulator 50. That is, the light beam of the wavelength $\lambda 1$ is not influenced by the second phase modulator 50, and the light beam of the wavelength $\lambda 2$ is not influenced by the first phase modulator 30. Therefore, a diffraction effect can be independently provided for a light beam of each wavelength, and the off-axis characteristics with respect each light beam can be improved. In addition, the correction functions for temperature characteristics and chromatic aberration can be improved.

Figure 4B:
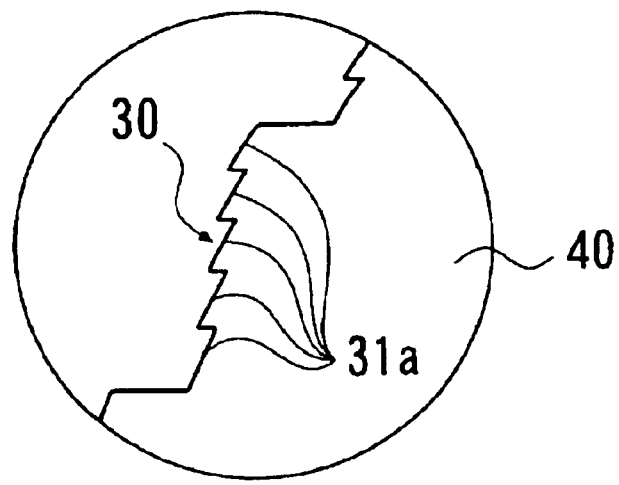
Figure 4C:
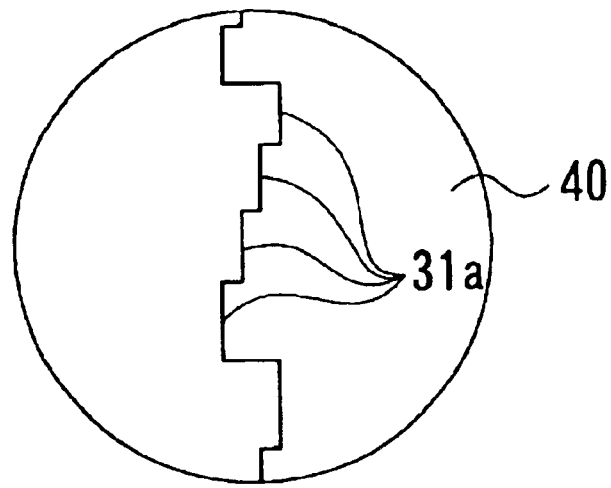

The first phase modulator 30 (ditto for the second phase modulator 50) may be shaped such that the stepped portions 31a protrude forward with an increase in distance from the optical axis L as shown in FIG. 4B, or the surfaces of the stepped portions 31a may be located in the vertical plane with respect to the optical axis as shown in FIG. 4C.

Alternatively, the first phase modulator 30 may have the shape shown in FIGS. 5A and 5B. More specifically, a plurality of diffraction rings 32 which are serrated discontinuous surfaces each having a substantial inclination with respect to a predetermined aspherical shape S centered on the optical axis L are formed on the incident surface 41a (or the exit surface 41b) of the objective lens. In addition, a discontinuous part 31 comprised of stepped portions 31a formed along the optical axis is formed on the optical surface of each diffraction ring 32 to provide a predetermined optical path difference for a light beam passing through each diffraction ring 32.

The shape of the surface (optical function surface) of each stepped portion is approximated to the shape obtained by dividing the surface shape of each serrated diffraction ring 32, which is indicated by the chain double-dashed line in FIGS. 5A and 5B, into sections each corresponding to each stepped portion 31a, and translating the sections in the direction of the optical axis L.

Figure 6:
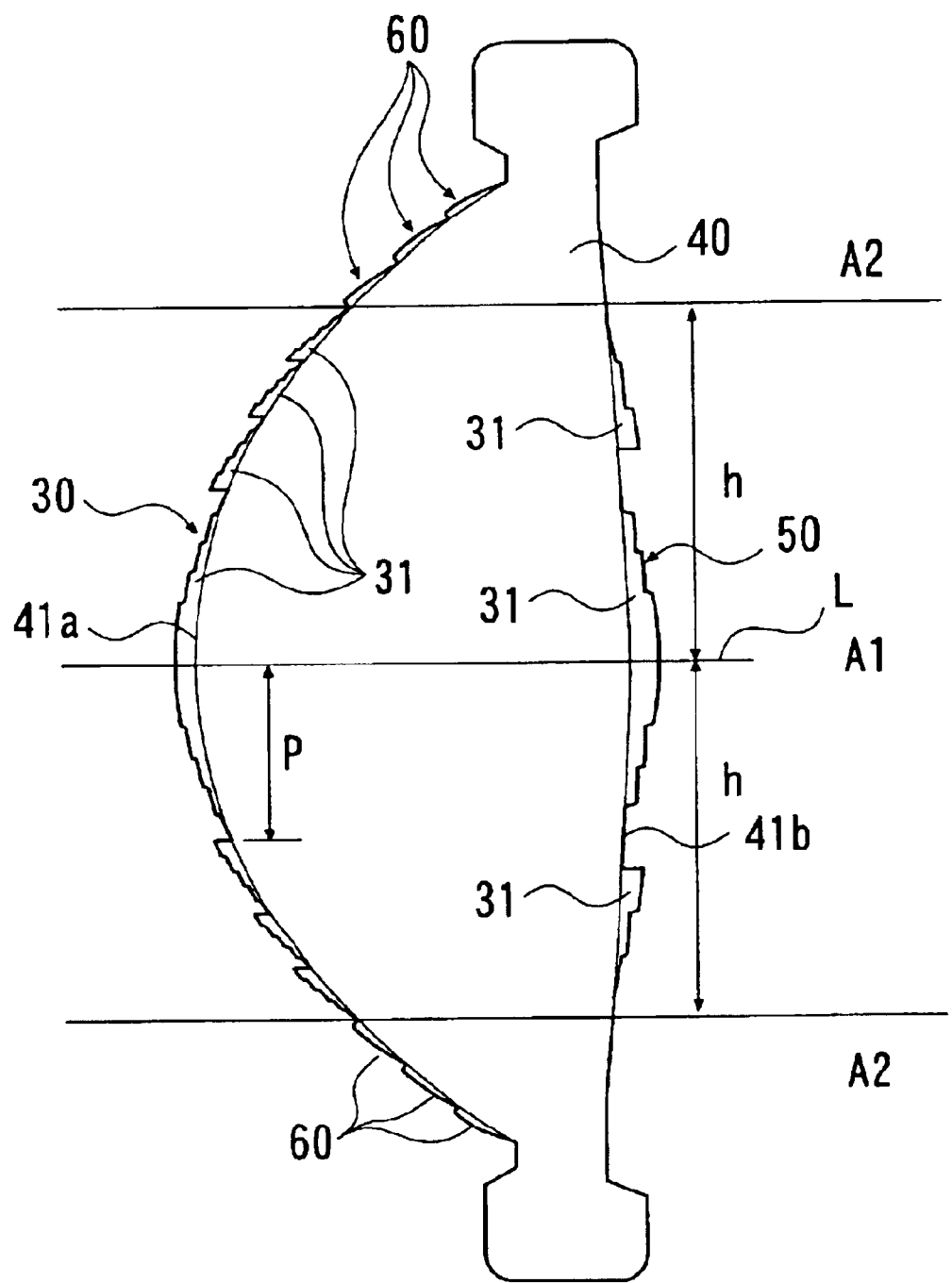
FIG. 6 is a plan view showing the arrangement of an objective lens.

Alternatively, as shown in FIG. 6, one or both of the optical surfaces of the objective lens 40 may be divided into a range (to be referred to as a "central area A1" hereinafter) of a predetermined height h or less centered on the optical axis L and a range (to be referred to as a "peripheral area A2" hereinafter) other than the central area A1. The first phase modulator 30 and second phase modulator 50 may be provided for the central area A1, and serrated diffraction rings 60 may be provided for the peripheral area A2 or the peripheral area may be formed by a refracting surface.

In this case, for example, both light beams of the wavelength λ1 and wavelength λ2 passing through the peripheral area A2 are provided with a diffraction effect by the diffraction rings 60 to condense the light beam of the wavelength λ1 onto the information recording surface 20a of the DVD and condense the light beam of the wavelength λ2 outside the protective substrate 20b of the CD, thereby providing the objective lens 40 with an aperture limiting function for the light beam of the wavelength λ2.

In this exemplified mode, the first semiconductor laser 11 and second semiconductor laser 12 are integrated into a unit as a light source, the first phase modulator 30 and second phase modulator 50 are respectively formed on the incident surface 41a and exit surface 41b of the objective lens 40, and divergent light is incident on the objective lens 40. However, the present invention is not limited to this arrangement. For example, the embodiment may take the arrangement shown in FIGS. 7 to 9 and FIG. 11.

Figure 7:
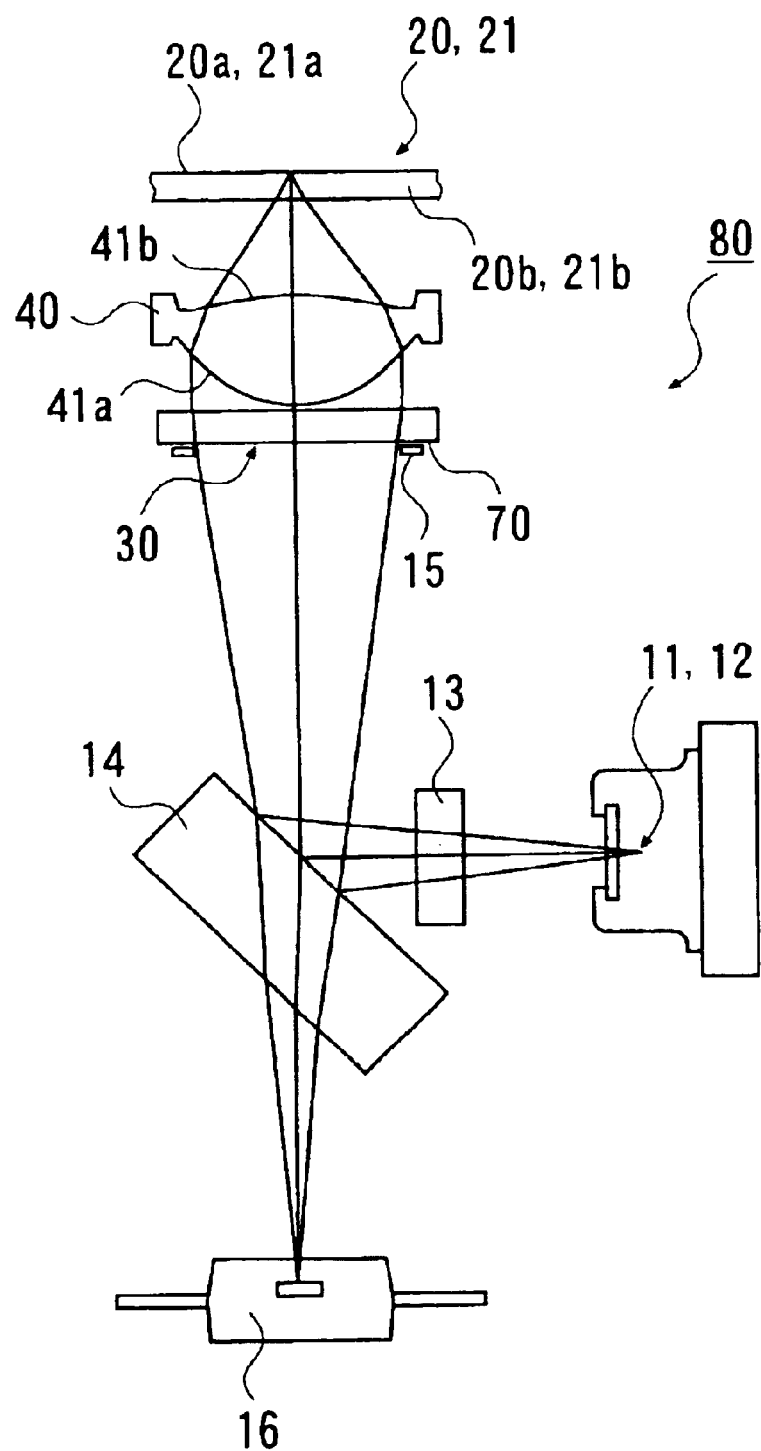
FIG. 7 is a plan view showing another example of the arrangement of the optical pickup apparatus.

In an optical pickup apparatus 80 shown in FIG. 7, a flat optical element 70 (see FIGS. 8A to 8C) is placed near the objective lens 40, and at least one of the first phase modulator 30 and second phase modulator 50 (only the first phase modulator 30 in FIG. 8) is formed on the optical surface of the optical element 70.

Figure 9:
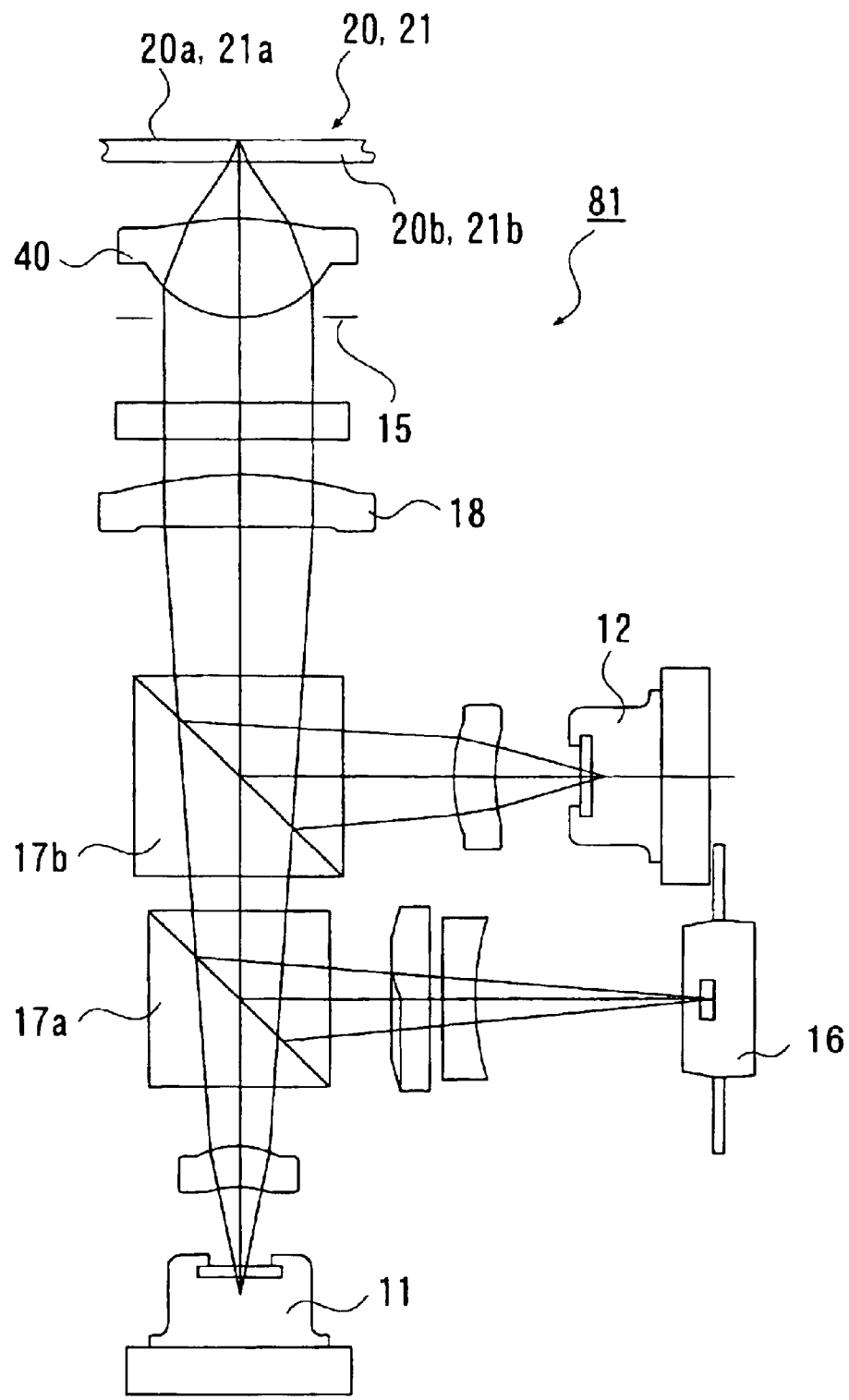
FIG. 9 is a plan view showing still another example of the arrangement of the optical pickup apparatus.

An optical pickup apparatus 81 shown in FIG. 9 includes the first semiconductor laser 11 and second semiconductor laser 12 as separate units. In this arrangement, each light beam is split by two beam splitters 17a and 17b, and is incident, as parallel light (infinite light), on the objective lens 40 through a collimator lens 18, thereby reading reflected light from a predetermined optical information recording medium by using the photodetector 16.

Figure 10:
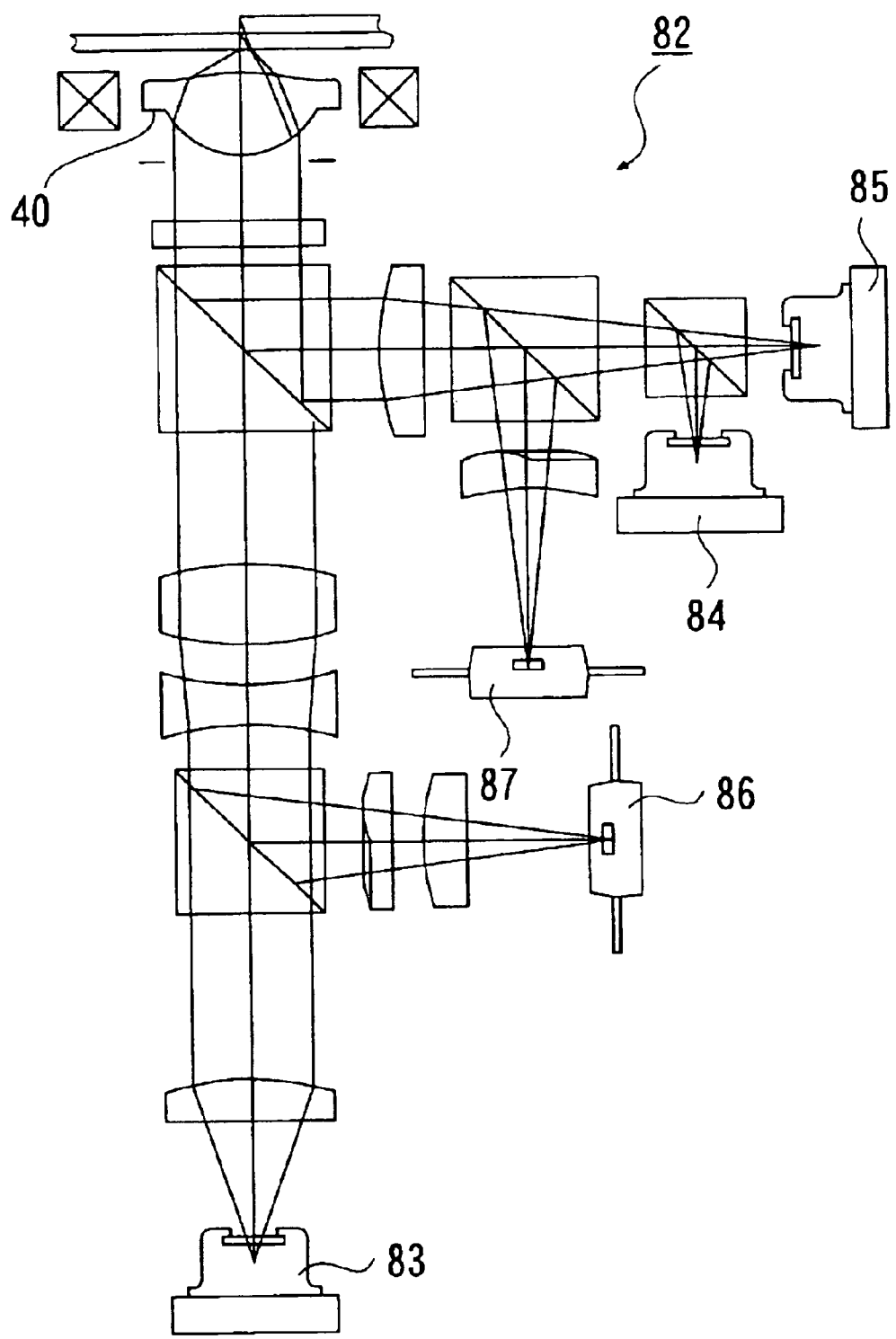
FIG. 10 is a plan view showing still another example of the arrangement of the optical pickup apparatus.

In addition, like an optical pickup apparatus 82 shown in FIG. 10, the optical pickup apparatus may have an arrangement which includes first, second and third semiconductor lasers 84, 85 and 83 which emit light beams of the wavelength λ1, the wavelength λ2 and the wavelength λ3, respectively, causes a photodetector 86 to read the light beam of the wavelength λ3 (350 nm≦λ3≦450 nm), and causes a photodetector 87 to read the light beams of the wavelengths λ1 (600 nm≦λ1≦700 nm) and λ2 (750 nm≦λ1≦850 nm).

Assume that in this case, the first phase modulator 30 and second phase modulator 50 provide a diffraction effect for the light beams of wavelengths λ1 and λ2, and the first phase modulator 30 and second phase modulator 50 are formed on the optical surface of an optical element placed on the common optical path of the two types of light beams.

Note that a third phase modulator may also be provided to allow the first phase modulator 30, second phase modulator 50, and third phase modulator to provide diffraction effects for all light beams of the three types of wavelengths λ1 to λ3.

Figure 11:
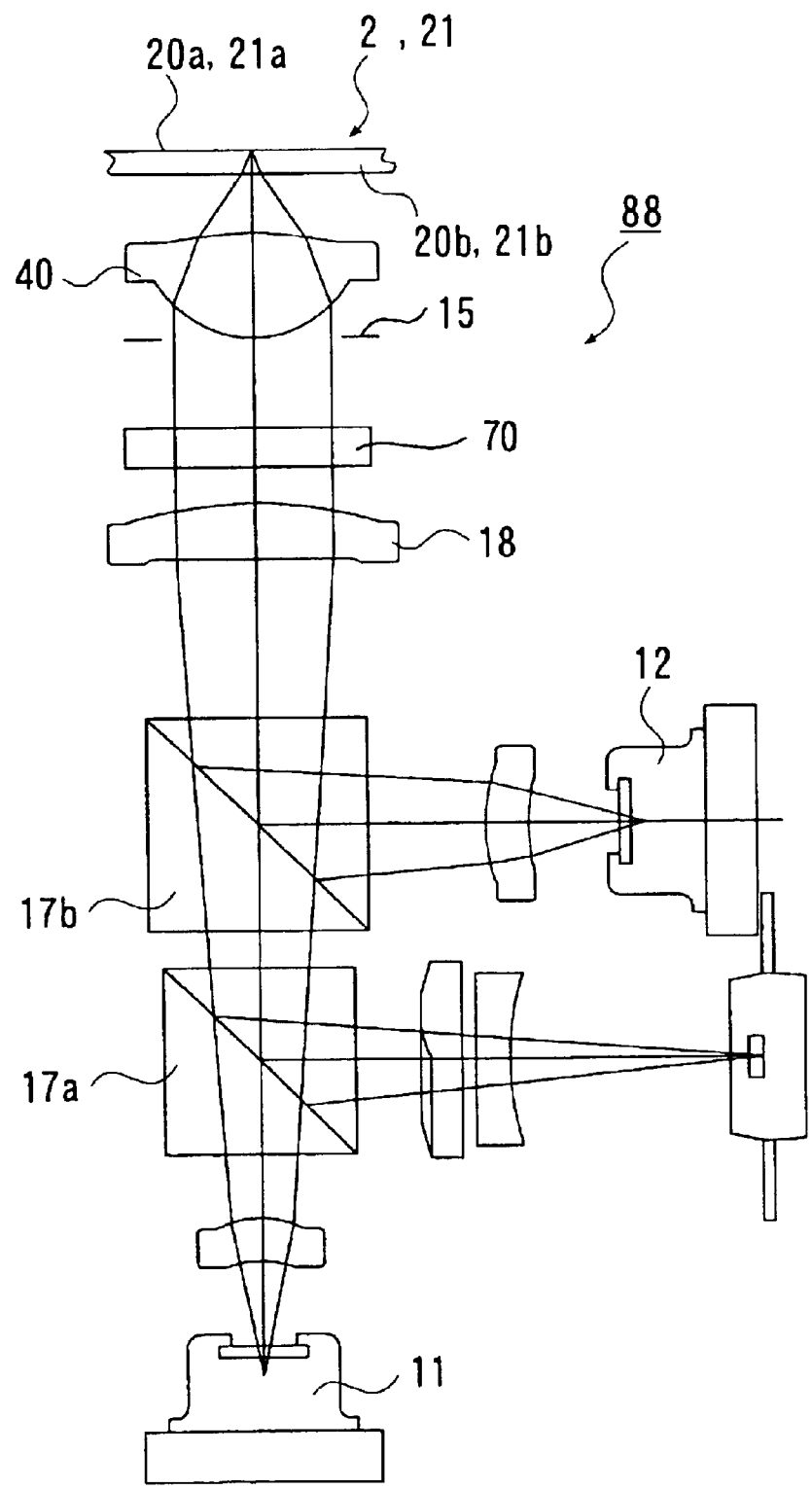
FIG. 11 is a plan view showing a modification of the optical pickup apparatus shown in FIG. 9.

An optical pickup apparatus 88 shown in FIG. 11 greatly differs from the optical pickup apparatus 81 shown in FIG. 9 in that the optical element 70 in the form of a parallel plate is placed between the objective lens 40 and the collimator lens 18 in the optical pickup apparatus 81 shown in FIG. 9, and the first phase modulator 30 and second phase modulator 50 are formed on the optical surface of the optical element 70 instead of the optical surface of the objective lens 40. The other arrangement is substantially the same as that of the optical pickup apparatus 81 shown in FIG. 9.

Figure 12:
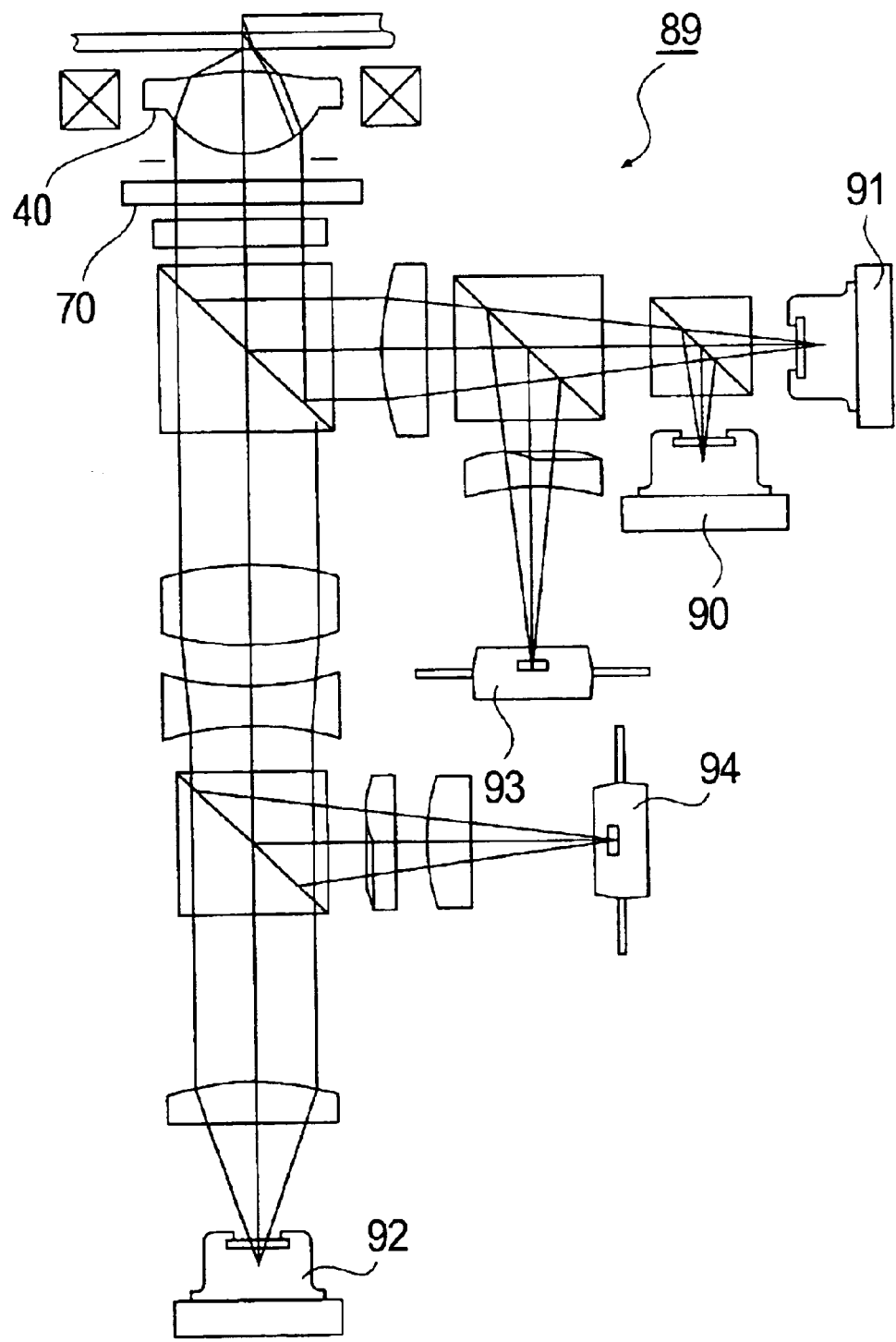
FIG. 12 is a plan view showing a modification of the optical pickup apparatus shown in FIG. 10.

An optical pickup apparatus 89 shown in FIG. 12 greatly differs from the optical pickup apparatus 82 shown in FIG. 10 in that the optical element 70 in the form of a parallel plate is placed on the light source side of the objective lens 40 in the optical pickup apparatus 82 shown in FIG. 10, and the first phase modulator 30 and second phase modulator 50 are formed on the optical surface of the optical element 70. In addition, this arrangement includes first to third semiconductor lasers 90 to 92 which emit light beams of the wavelengths λ1 to λ3, causes a common photodetector 93 to read the light beams of the wavelengths λ1 and λ2, and causes a photodetector 94 to read the light beam of the wavelength λ3. In this arrangement, the first phase modulator 30 provides a diffraction effect for the light beam of the wavelength λ1, and the second phase modulator 50 provides a diffraction effect for the light beam of the wavelength λ2.

Several preferred embodiments of the optical pickup apparatus, condensing optical system, and optical element of the above-described exemplified modes will be described next. The following are the symbols which are used for the description of an optical element and objective lens according to each embodiment:

$f_1$: focal length for wavelength λ1 of light beam emitted from first light source $f_2$: focal length for wavelength λ2 of light beam emitted from second light source NA1: image-side numerical aperture for wavelength λ1 of light beam emitted from first light source NA2: image-side numerical aperture for wavelength λ2 of light beam emitted from second light source Ri: radius of curvature di: change amount from ith surface to (i+1)th surface in optical axis direction ni: refractive index on each surface κ: cone constant h: height from optical axis

FIRST EMBODIMENT

An optical pickup apparatus according to the first embodiment has compatibility with a high-density optical disk HD and a general DVD (to be simply referred to as a DVD hereinafter). An objective lens 40 used in the first embodiment is a single lens with two aspherical surfaces like that shown in FIG. 3, which includes a first phase modulator 30 formed on the entire area of an incident surface 41a, and a second phase modulator 50 formed on the entire area of an exit surface 41b. The optical pickup apparatus using this objective lens has an arrangement like that shown in FIG. 9, in which two types of parallel light beams of different wavelengths are incident on the objective lens 40. In the first embodiment, the first semiconductor laser emits the light beam of the wavelength λ1 (350 nm≦λ1≦450 nm) and, on the other hand, the second semiconductor laser emits the light beam of the wavelength λ2 (600 nm≦λ1≦700 nm)

FIG. 3 is a schematic view showing the objective lens 40 used in the first embodiment. The numbers of discontinuous parts of the first phase modulator 30 and second phase modulator 50 in the first embodiment are different from those shown in FIG. 3.

As shown in FIG. 4A, the first phase modulator 30 has stepped portions 31a which protrude forward with a decrease in distance to an optical axis L, and the second phase modulator 50 has stepped portions 31a which protrude forward with an increase in distance from the optical axis L.

Tables 1 and 2 show the lens data of the optical element and objective lens used in the first embodiment.

TABLE 1 focal length: $f_1$ = 2.75 mm, $f_2$ = 2.82 mm
numerical aperture: NA1 = 0.65, NA2 = 0.63
imaging magnification: m = 0.0, m = 0.0

| $i^{th}$ Surface | Ri | Di (405 nm) | Ni (405 nm) | Di (660 nm) | Ni (660 nm) | |
|---|---|---|---|---|---|---|
| 0 | ∞ | | ∞ | | | |
| 1 | ∞ | 0.0 | 1.0 | 0.0 | 1.0 | stop diameter: 3.575 mm |
| 2 | 1.74038 | 1.7000 | 1.542936 | 1.7000 | 1.528968 | aspherical surface/diffraction surface |
| 3 | −6.89562 | 1.33286 | 1.0 | 1.38663 | 1.0 | aspherical surface/diffraction surface |
| 4 | ∞ | 0.6 | 1.614341 | 0.6 | 1.577181 | |
| 5 | ∞ | | | | | |

As shown in Table 1, the objective lens according to the first embodiment is designed such that when a light beam emitted from the first light source has the wavelength $\lambda 1$ (=405 nm), focal length $f_1$=2.75 mm, image-side numerical aperture NA1=0.65, and imaging magnification m=0.0 are set, whereas when a light beam emitted from the second light source has the second wavelength $\lambda 2$ (=660 nm), focal length $f_2$=2.82 mm, image-side numerical aperture NA2=0.63, and imaging magnification m=0.0 are set.

In Table 1, the surface numbers ($i^{th}$ surface) 2 and 3 indicate the incident and exit surfaces of the objective lens, respectively, and the surface numbers ($i^{th}$ surface) 4 and 5 indicate the surface of a protection substrate and information recording surface of an optical information recording medium, respectively.

TABLE 2

(Aspherical Surface/Diffraction Surface Data)

Second Surface

Aspherical Surface Coefficient

κ: −4.5534E−01
$A_4$: −1.0995E−03
$A_6$: −6.9963E−05
$A_8$: −2.3043E−04
$A_{10}$: +3.3992E−05
$A_{12}$: +1.9380E−05
$A_{14}$: −6.0879E−06

Optical Path Difference Function Coefficient $B_2$: +0.0000E+00
$B_4$: −3.7855E+01
$B_6$: +6.8363E−01
$B_8$: −3.4180E−01
$B_{10}$: +1.0525E−01

Third Surface

Aspherical Surface Coefficient

κ: −5.6999E+01
$A_4$: +3.8760E+03
$A_6$: +3.0369E−04
$A_8$: −2.4686E−04
$A_{10}$: −7.9502E−05
$A_{12}$: +1.8897E−05
$A_{14}$: +1.0702E−06

TABLE 2-continued (Aspherical Surface/Diffraction Surface Data)

Optical Path Difference Function Coefficient $B_2$: +0.0000E+00
$B_4$: −3.2247E−01
$B_6$: +3.1139E−03
$B_8$: +3.2918E−03
$B_{10}$: −6.7431E−02

Figure 13A:
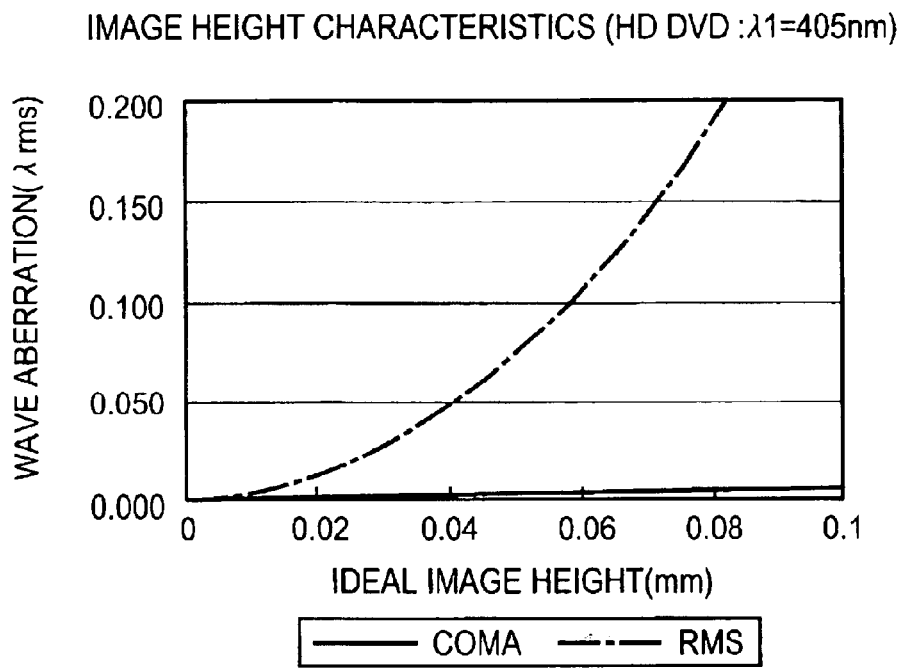
FIGS. 13A and 13B are graphs each showing the image height characteristics of the objective lens according to the first embodiment.
Figure 13B:
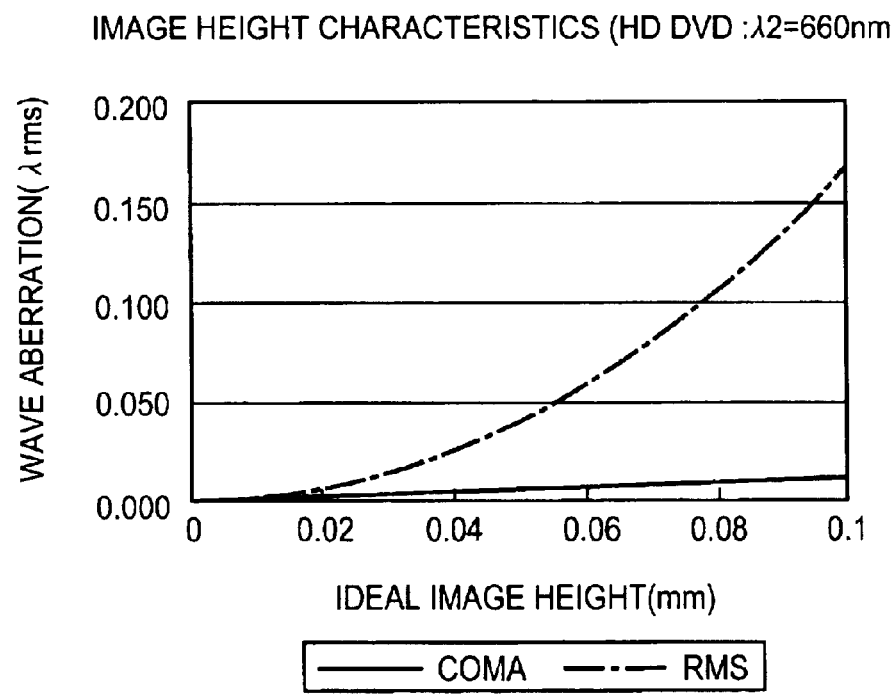

FIG. 13A is a graph showing the image height characteristics of the objective lens when a light beam of the wavelength $\lambda 1$ (405 nm) is used for a high-density optical disk. FIG. 13B is a graph showing the image height characteristics of the objective lens when a light beam of the wavelength $\lambda 2$ (660 nm) is used for a DVD.

In each graph, "COMA" indicates coma; and "RMS", the wave aberration obtained by adding spherical aberration, coma, and astigmatism.

As is understood from FIGS. 13A and 13B, the objective lens according to the first embodiment has good image height characteristics within an application range with respect to light beams of the wavelengths $\lambda 1$ and $\lambda 2$.

Figure 14A:
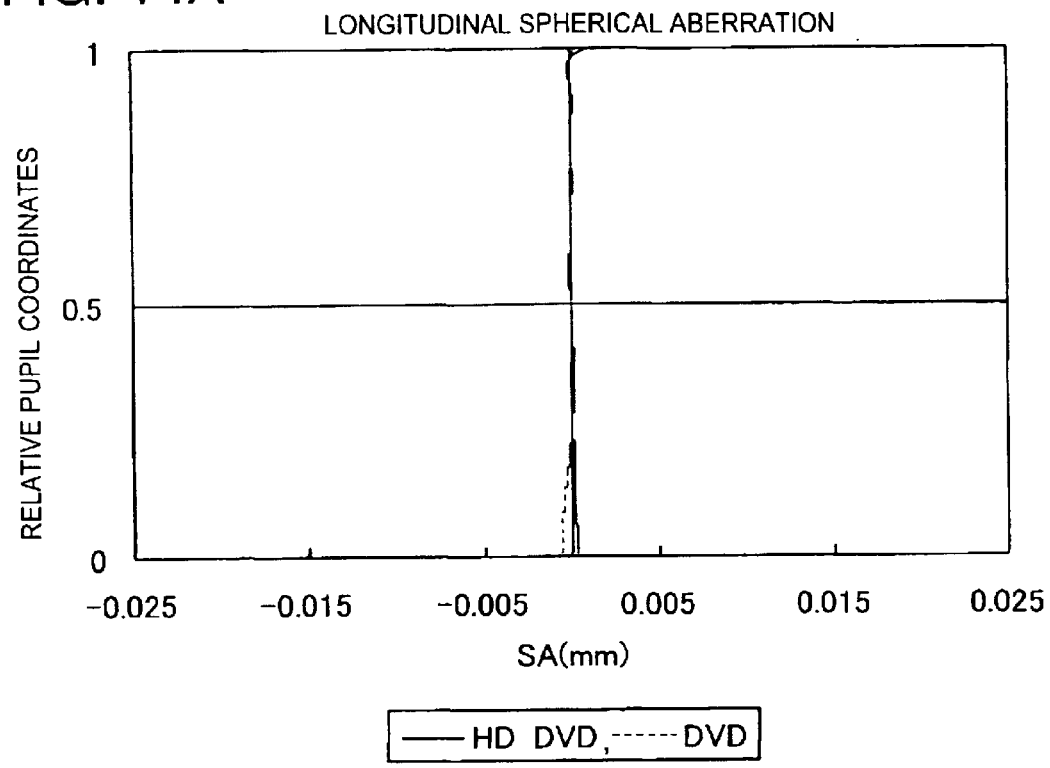
FIGS. 14A and 14B are a graph showing the longitudinal spherical aberration of the objective lens according to the first embodiment and a graph showing a the amount of offense against the sine condition.
Figure 14B:
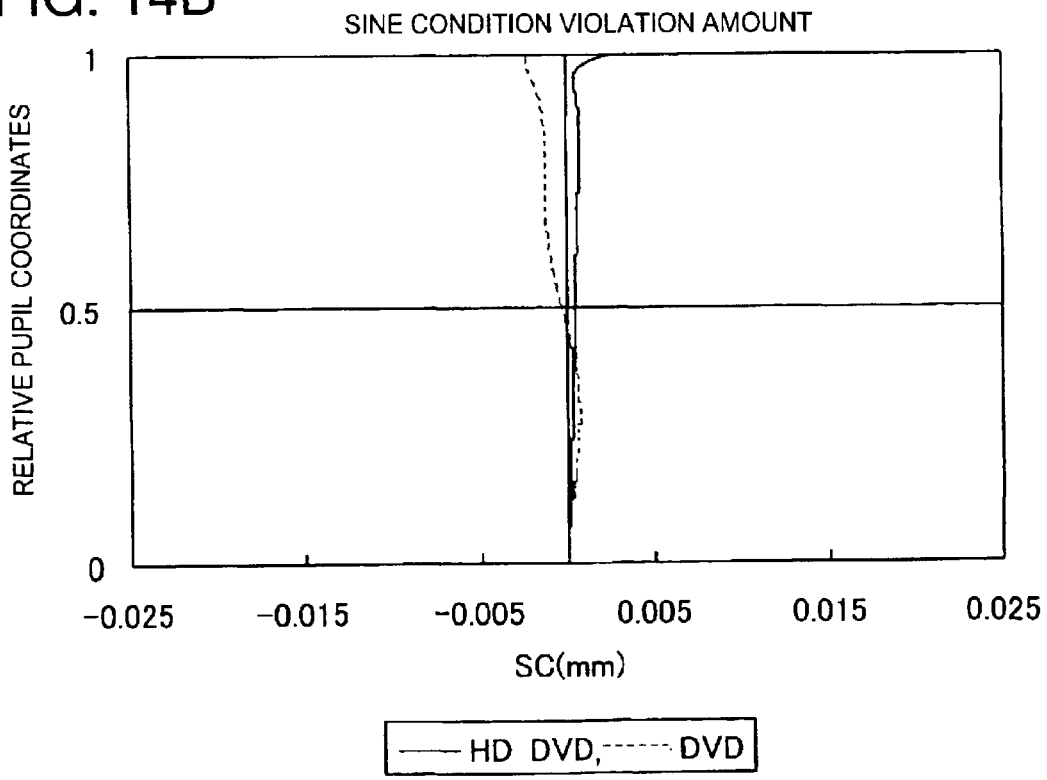

FIG. 14A is a graph showing longitudinal spherical aberration when a light beam of the wavelength $\lambda 1$ is used (HD) and a light beam of the wavelength $\lambda 2$ is used (DVD). FIG. 14B is a graph showing the amount of offense against the sine condition when a light beam of the wavelength $\lambda 1$ is used (HD) and a light beam of the wavelength $\lambda 2$ is used (DVD).

As is understood from FIGS. 14A and 14B, the objective lens according to the first embodiment has a good longitudinal spherical aberration correction function within an application range with respect to light beams of wavelength $\lambda 1$ and $\lambda 2$, and can effectively correct the amount of offense against the sine condition.

SECOND EMBODIMENT

The second embodiment of the optical pickup apparatus, condensing optical system, and optical element of the present invention will be described next.

The optical pickup apparatus of the second embodiment has compatibility with DVDs and CDs. An objective lens 40 used in the second embodiment is a single lens with two aspherical surfaces. A first phase modulator is provided in a central area A1, formed on the incident surface of the objective lens, whose height h from an optical axis L is 1.555 mm or less, and a second phase modulator is provided in a central area, formed on the exit surface, whose height h from the optical axis L is 1.24 mm or less. The optical pickup apparatus using this objective lens has an arrangement like that shown in FIG. 1, in which two types of divergent light beams of different wavelengths are incident on the objective lens 40. Note that in this embodiment, staircase-like discontinuous parts are also formed in a peripheral area A2 of the incident surface, and a refracting surface is formed in the peripheral area A2 of the exit surface.

The first phase modulator is designed such that the stepped portions 31a protrude forward with an increase in distance from the optical axis L, as shown in FIG. 4B. The second phase modulator is designed such that the stepped portions 31a protrude forward with a decrease in distance to the optical axis L, as shown in FIG. 4A.

Tables 3 and 4 show the lens data of the optical element and objective lens used in the second embodiment.

TABLE 3 focal length: $f_1$ = 2.89 mm, $f_2$ = 2.91 mm
numerical aperture: NA1 = 0.60, NA2 = 0.47
imaging magnification: m = −0.125, m = −0.124

| $i^{th}$ Surface | Ri | Di (655 nm) | Ni (655 nm) | Di (790 nm) | Ni (790 nm) | |
|---|---|---|---|---|---|---|
| 0 | | 15.55101 | | 15.91782 | | |
| 1 | ∞ | 0.0 | 1.0 | 0.0 | 1.0 | stop diameter: 3.846 mm |
| 2 | 1.95984 | 2.0 | 1.52915 | 2.0 | 1.52530 | aspherical surface/diffraction surface |
| 2' | 1.94035 | 0.00092 | — | 0.00092 | — | aspherical surface/diffraction surface |
| 3 | −4.49143 | 1.84899 | 1.0 | 1.48218 | 1.0 | aspherical surface/diffraction surface |
| 4 | ∞ | 0.6 | 1.577521 | 1.2 | 1.57042 | |
| 5 | ∞ | | | | | |

*d2' indicates change amount from second surface to second' surface in optical axis direction As shown in Table 4, the objective lens according to the second embodiment is designed such that when a light beam emitted from the first light source has the wavelength $\lambda 1$ (=655 nm), focal length $f_1$=2.89 mm, image-side numerical aperture NA1=0.60, and imaging magnification m=−0.125 are set, whereas when a light beam emitted from the second light source has the second wavelength $\lambda 2$ (=790 nm), focal length $f_2$=2.91 mm, image-side numerical aperture NA2= 0.47, and imaging magnification m=−0.124 are set.

In Table 3, surface numbers 2, 2', and 3 respectively indicate the central area A1, of the incident surface of the objective lens, whose height h from an optical axis L is 1.555 mm or less, a peripheral area A2, of the incident surface, whose height from the optical axis L is 1.555 mm or more, and the exit surface of the objective lens.

TABLE 4

(Aspherical Surface/Diffraction Surface Data)

Second Surface (0 ≦ h < 1.555 mm)

Aspherical Surface Coefficient

κ: −4.5534E−01
$A_4$: −1.0995E−03
$A_6$: −6.9963E−05
$A_8$: −2.3043E−04
$A_{10}$: +3.3992E−05
$A_{12}$: +1.9380E−05
$A_{14}$: −6.0879E−06

Optical Path Difference Function Coefficient $B_2$: +0.0000E+00
$B_4$: −3.7855E+01
$B_6$: +6.8363E−01
$B_8$: −3.4180E−01
$B_{10}$: +1.0525E−01

TABLE 4-continued (Aspherical Surface/Diffraction Surface Data)

Second' Surface (1.555 mm ≦ h)

Aspherical Surface Coefficient

κ: −6.9983E−01
$A_4$: +9.4388E−04
$A_6$: −3.3067E−04
$A_8$: +3.0132E−04
$A_{10}$: −1.6103E−04
$A_{12}$: +4.1577E−05
$A_{14}$: −4.7480E−06

Optical Path Difference Function Coefficient $B_2$: +3.1707E+00
$B_4$: −5.4186E−01
$B_6$: +5.6762E−01
$B_8$: −1.3564E−01
$B_{10}$: +8.5783E−03

TABLE 4-continued (Aspherical Surface/Diffraction Surface Data)

Third Surface

Aspherical Surface Coefficient

κ: −1.7891E+01
$A_4$: +5.4708E+04
$A_6$: +3.3764E−04
$A_8$: +5.7408E−05
$A_{10}$: −2.4814E−05
$A_{12}$: −1.1062E−05
$A_{14}$: +1.9234E−06
Optical Path Difference Function Coefficient $B_2$: +0.0000E+00
$B_4$: −3.0360E−01
$B_6$: +2.3800E−00
$B_8$: −7.7681E−01
$B_{10}$: +1.0436E−01

Figure 15A:
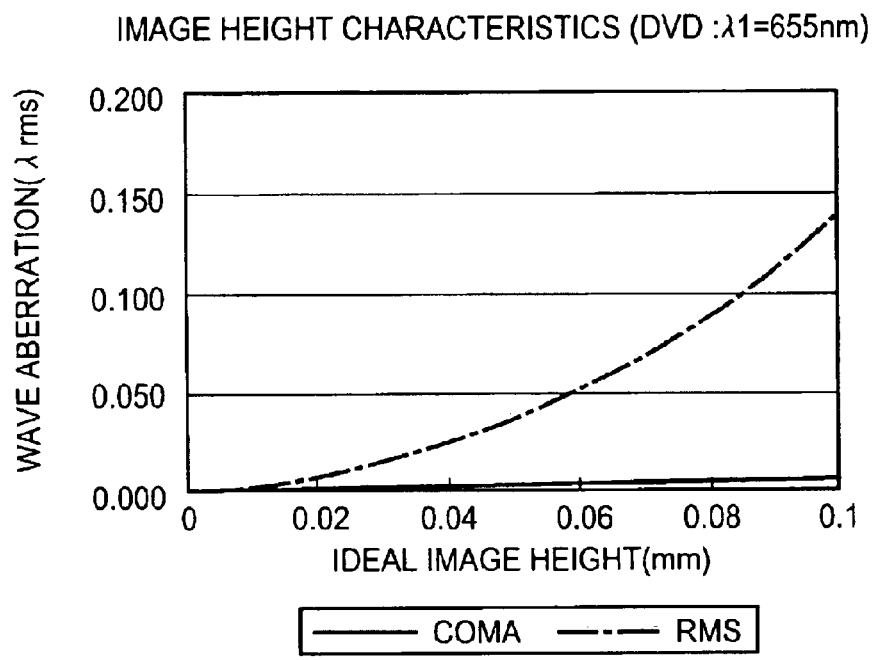
FIGS. 15A and 15B are graphs each showing the image height characteristics of the objective lens according to the second embodiment.
Figure 15B:
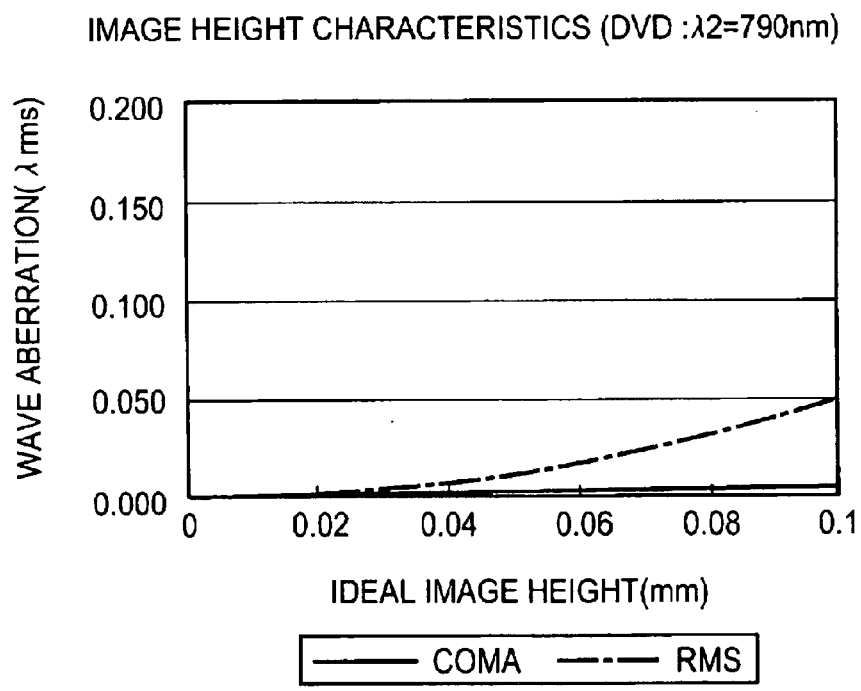

FIG. 15A is a graph showing the image height characteristics of the objective lens when a light beam of the wavelength λ1 (655 nm) is used for a DVD. FIG. 15B is a graph showing the image height characteristics of the objective lens when a light beam of the wavelength λ2 (790 nm) is used for a CD.

In each graph, "COMA" indicates coma; and "RMS", the wave aberration obtained by adding spherical aberration, coma, and astigmatism.

As is understood from FIGS. 15A and 15B, the objective lens according to the second embodiment has good image height characteristics within an application range with respect to light beams of the wavelengths λ1 and λ2.

Figure 16A:
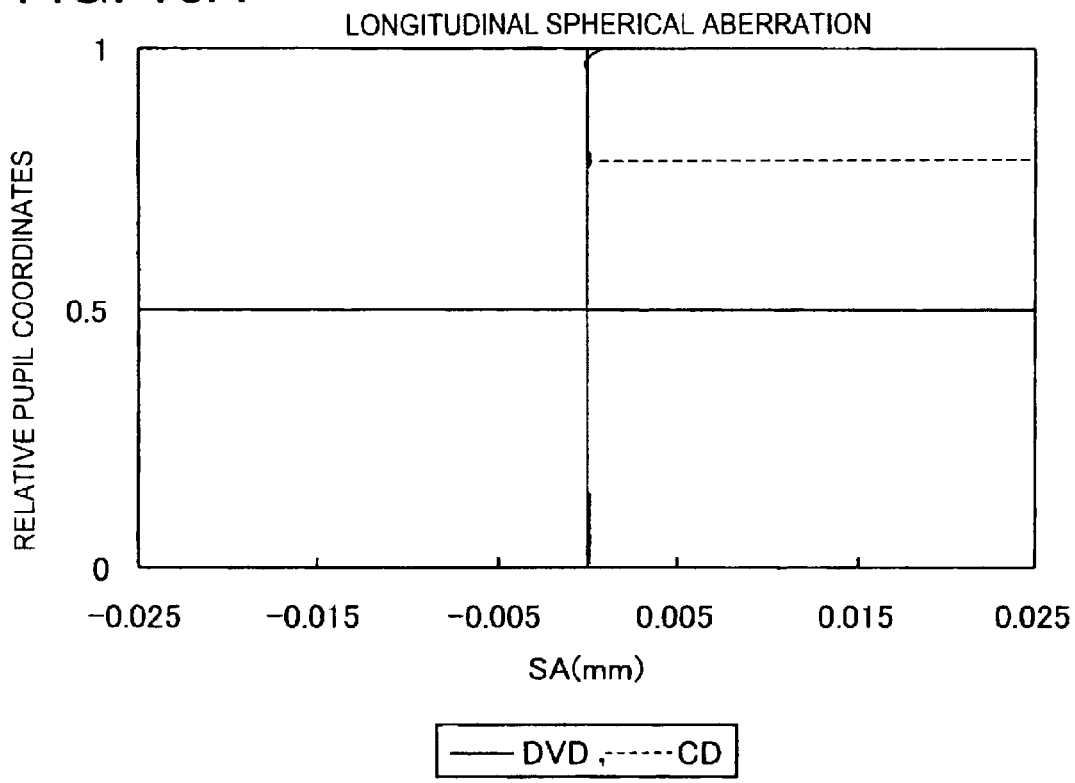
FIGS. 16A and 16B are a graph showing the longitudinal spherical aberration of the objective lens according to the second embodiment and a graph showing a the amount of offense against the sine condition.
Figure 16B:
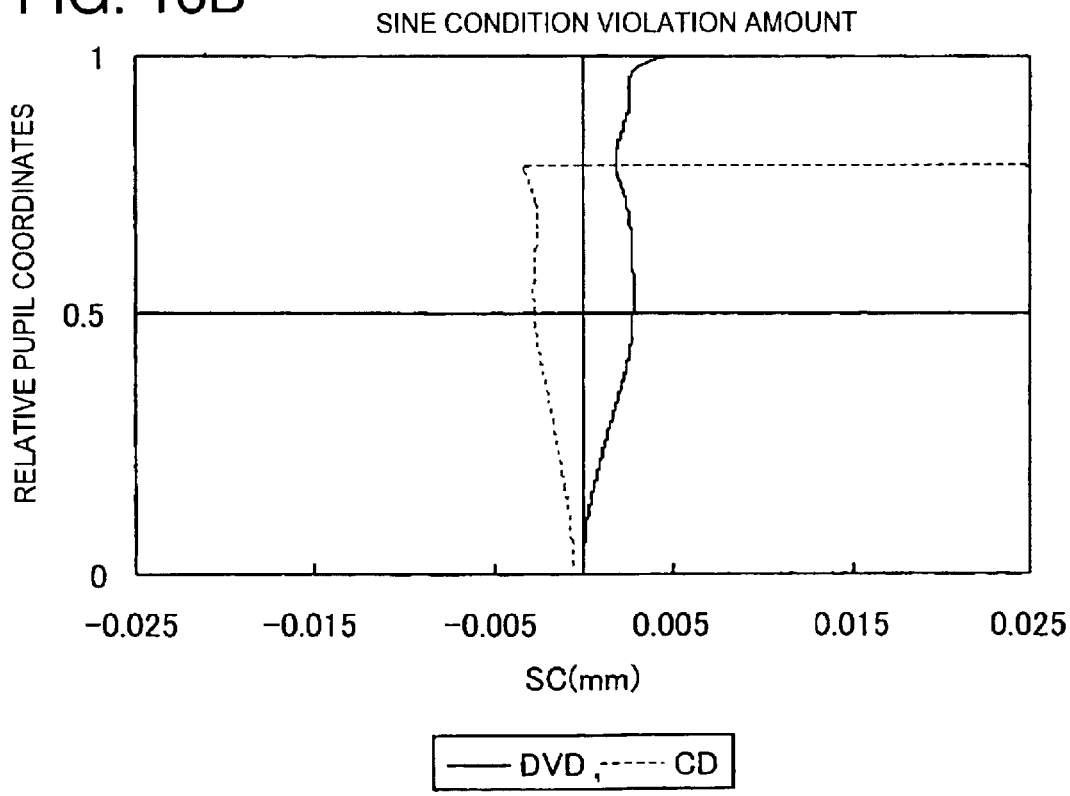

FIG. 16A is a graph showing longitudinal spherical aberration when a light beam of the wavelength λ1 is used (DVD) and a light beam of the wavelength λ2 is used (CD). FIG. 16B is a graph showing the amount of offense against the sine condition when a light beam of the wavelength λ1 is used (DVD) and a light beam of the wavelength λ2 is used (CD).

As is understood from FIGS. 16A and 16B, the objective lens according to the second embodiment has a good longitudinal spherical aberration correction function within an application range with respect to light beams of wavelength λ1 and λ2, and can effectively correct the amount of offense against the sine condition.

THIRD EMBODIMENT

The third embodiment of the optical pickup apparatus, condensing optical system, and optical element of the embodiment of the present invention will be described next.

The third embodiment exemplifies an optical pickup apparatus including an optical element which reduces the occurrence of aberration at the time of a change in temperature and having compatibility with DVDs and CDs.

As shown in FIG. 11, an optical element 70 in the form of a parallel plate (a correction element for reducing the occurrence of aberration accompanying a change in ambient temperature) is provided near an objective lens 40 as a single lens with two aspherical surfaces, and a light beam from a light source is incident as parallel light on the objective lens 40. A first phase modulator 30 is provided on the incident surface (the surface on the light source side) of the optical element 70, and a second phase modulator 50 is provided on the exit surface (the surface on the optical information recording medium side).

Figure 17:
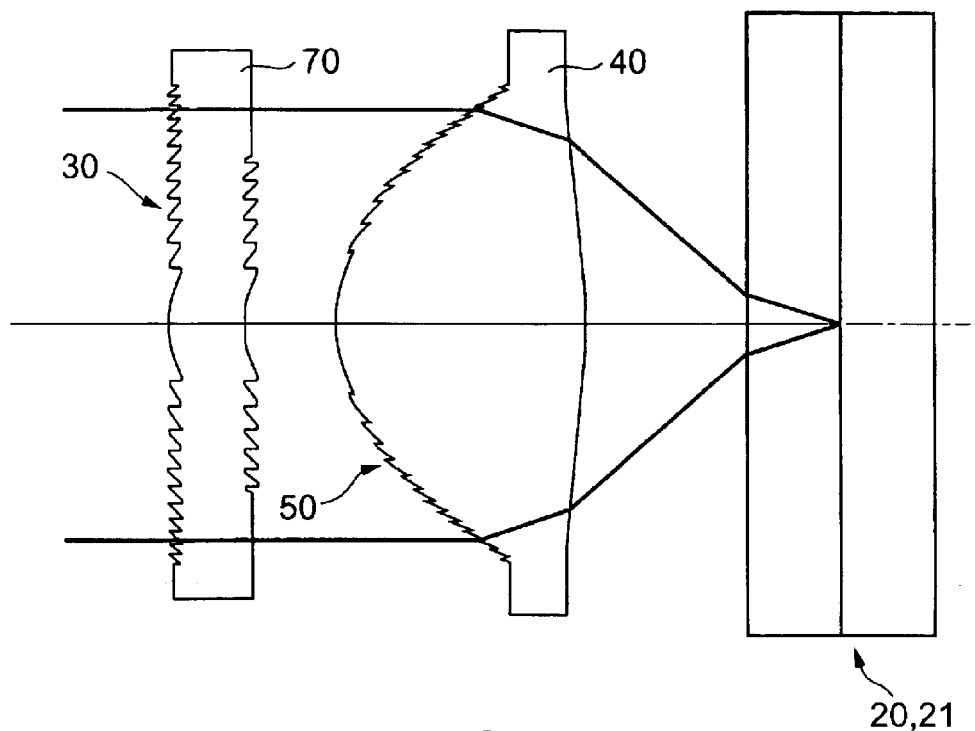
FIG. 17 is a plan view showing the condensed state of light obtained by an optical element and objective lens used in the third embodiment of the present invention.

FIG. 17 is a schematic view showing the optical element 70 and objective lens 40 used in this embodiment. In this embodiment, the first phase modulator 30 is provided on the first surface (the incident surface of the optical element 70), and the second phase modulator 50 is provided on the second surface (the exit surface of the optical element 70). Of the fourth and fourth' surfaces (the incident surface of the objective lens 40) and the fifth surface (the exit surface of the objective lens 40), the fourth and fourth' surfaces are provided with diffraction structures which are formed in the form of rings centered on the optical axis and have serrated cross-sections. The ring pitches of the diffraction structures of the fourth and fourth' surfaces are defined by the optical path difference functions shown in Table 6. As described above, the incident surface is comprised of the two areas of the fourth and fourth' surfaces, and is designed to prevent a light beam, of light beams of a wavelength λ2 (790 nm), which passes through the area of the fourth' surface from being condensed onto the information recording surface of the second optical information recording medium (CD). Owing to the diffraction effect of the first phase modulator formed on the first surface of the optical element 70, when information is to be recorded on or played back from the first optical information recording medium (DVD), spherical aberration due to a change in refractive index accompanying a change in ambient temperature (e.g., 0° C. to 85° C.) and spherical aberration due to a change in wavelength accompanying a change in ambient temperature act in a direction to cancel out each other.

Tables 5 and 6 show the lens data of the optical element and objective lens used in the third embodiment. Table 7 shows the refractive indexes at the respective wavelengths with respect to glass materials A, B and C in Table 5.

TABLE 5 focal length: $f_1$ = 3.05 mm, $f_2$ = 3.06 mm
numerical aperture: NA1 = 0.65, NA2 = 0.51
imaging magnification: m = 0.0, m = 0.0

| $i^{th}$ Surface | Ri | di (655 nm) | di (790 nm) | Glass Material | |
|---|---|---|---|---|---|
| 0 | ∞ | ∞ | ∞ | | |
| 1 | ∞ | 0.8 | 0.8 | A | aspherical surface/diffraction surface |
| 2 | ∞ | 0.5 | 0.5 | Air (n = 1.0) | Aspherical surface/diffraction surface |
| 3 | ∞ | 0.0 | 0.0 | — | stop diameter: 3.965 mm |
| 4 | 1.88103 | 1.7 | 1.7 | B | aspherical surface/diffraction surface (serrated) |
| 4' | 1.84019 | −0.0161 | −0.0161 | — | aspherical surface/diffraction surface (serrated) |
| 5 | −8.61911 | 1.60751 | 1.3668 | Air (n = 1.0) | aspherical surface |
| 6 | ∞ | 0.6 | 1.2 | C | |
| 7 | ∞ | | | | |

*d4' indicates change amount from fourth surface to fourth' surface in optical axis direction As shown in Table 5, the objective lens according to the third embodiment is designed such that when a light beam emitted from the first light source has the wavelength λ1 (=655 nm), focal length $f_1$=3.05 mm, image-side numerical aperture NA1=0.65, and imaging magnification m=0.0 are set, whereas when a light beam emitted from the second light source has the second wavelength λ2 (=790 nm), focal length $f_2$=3.06 mm, image-side numerical aperture NA2=0.51, and imaging magnification m=0.0 are set.

In Table 5, the surface numbers 1 and 2 indicate the incident and exit surfaces of the optical element 70, respectively; the surface number 3, the stop, the surface numbers 4 and 4' and the surface number 5, the incident surface and exit surface of the objective lens, respectively; and the surface numbers 6 and 7, the surface of the protection substrate and the information recording surface of the protective substrate of the optical information recording medium, respectively.

TABLE 6

(Aspherical Surface/Diffraction Surface Data)

First Surface

Aspherical Surface Coefficient

κ: +0.0000E+00
$A_4$: +1.2781E-03
$A_6$: -5.2575E-05
$A_8$: -1.7885E-04
Optical Path Difference Function Coefficient $B_2$: -1.5152E-01
$B_4$: +1.6178E+00
$B_6$: +2.4669E-01
$B_8$: -1.4965E-01

Second Surface

Aspherical Surface Coefficient

κ: +0.0000E+00
$A_4$: -8.3103E-04
$A_6$: -3.7701E-04
$A_8$: +1.9911E-05
Optical Path Difference Function Coefficient $B_2$: +0.0000E-00
$B_4$: +1.3737E+00
$B_6$: +1.6507E-01
$B_8$: -1.1837E-01

Fourth Surface (0 ≤ h < 1.582 mm)

Aspherical Surface Coefficient

κ: -5.5135E-01
$A_4$: -2.0622E-03
$A_6$: +7.1956E-04
$A_8$: -3.6111E-04
$A_{10}$: -2.4290E-05
$A_{12}$: +2.9094E-05
$A_{14}$: -8.9205E-06
Optical Path Difference Function Coefficient $B_2$: +1.1352E+00
$B_4$: -3.0954E+00
$B_6$: +5.8059E-01
$B_8$: -3.4123E-01
$B_{10}$: +4.9208E-02
*Serrated Diffraction Structure Fourth' Surface (1.582 mm ≤ h)

Aspherical Surface Coefficient

κ: -5.0392E-01
$A_4$: -1.3162E-03
$A_6$: -6.7895E-04
$A_8$: +2.6378E-05
$A_{10}$: -3.5067E-06
$A_{12}$: -1.3669E-05
$A_{14}$: -6.2767E-06

TABLE 6-continued (Aspherical Surface/Diffraction Surface Data)

Optical Path Difference Function Coefficient $B_2$: -1.1703E+01
$B_4$: +6.2666E+00
$B_6$: -4.4936E-01
$B_8$: -6.5391E-01
$B_{10}$: +1.0407E-01
*Serrated Diffraction Structure Fifth Surface Aspherical Surface Coefficient κ: -8.6191E+00
$A_4$: -4.1893E+01
$A_6$: +1.1207E-02
$A_8$: -3.0978E-03
$A_{10}$: +2.3062E-04
$A_{12}$: +1.8883E-05
$A_{14}$: -2.5221E-05
$A_{16}$: +1.1157E-05

TABLE 7

(Refractive indexes at Respective Wavelengths)

|   | 797.5 nm | 790 nm | 666 nm | 660 nm |
|---|---|---|---|---|
| A | 1.50300 | 1.50314 | 1.50616 | 1.50635 |
| B | 1.53508 | 1.53525 | 1.53875 | 1.53896 |
| C | 1.57012 | 1.57042 | 1.57679 | 1.57718 |

FIG. 18 is a graph of temperature characteristics indicating changes in wave aberration with changes in ambient temperature in the third embodiment. Obviously, with regard to a DVD, changes in wave aberration with changes in ambient temperature are very small. Note that a glass material A exhibits a refractive index change (dn/dT) of -0.00012 at the time of a change in ambient temperature; and a glass material B, -0.00010. In addition, the DVD exhibits a wavelength fluctuation (dλ/dT) of 0.20 nm/° C. at the time of a change in ambient temperature; and the CD, 0.25 nm/° C.

FOURTH EMBODIMENT

The fourth embodiment of the optical pickup apparatus, condensing optical system, and optical element of the embodiment of the present invention will be described next.

The fourth embodiment exemplifies an optical pickup apparatus including an objective lens having compatibility with the first information recording medium (DVD), second optical information recording medium (CD), and third optical information recording medium (HD).

As shown in FIG. 12, an optical element 70 in the form of a parallel plate is provided near an objective lens 40 which is a single lens with two aspherical surfaces. In this arrangement, light beams of the respective wavelengths (λ1, λ2, and λ3) from three light sources are incident as parallel light beams on the objective lens 40. A first phase modulator 30 is provided on the incident surface (the surface on the light source side) of the optical element 70, and a second phase modulator 50 is provided on the exit surface (the surface on the optical information recording medium side).

Figure 19:
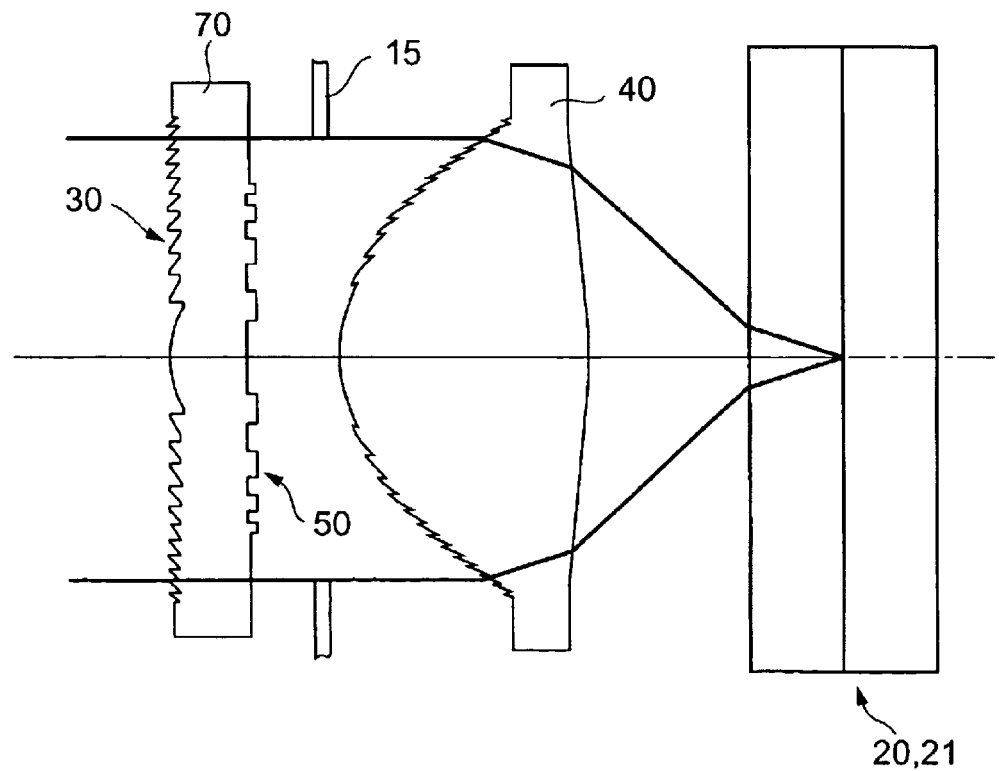
FIG. 19 is a plan view showing the condensed state of light obtained by an optical element and objective lens used in the fourth embodiment of the present invention.

FIG. 19 is a schematic view showing the optical element 70 and objective lens 40 used in the fourth embodiment. In this embodiment, the first phase modulator 30 is provided on the first surface (the incident surface of the optical element 70), and the second phase modulator 50 is provided on the second surface (the exit surface of the optical element 70). The objective lens is optimally designed for the third optical information recording medium (HD). On the fourth surface (the incident surface of the objective lens 40), a diffraction structure having a serrated cross-section is formed in the of rings centered on the optical axis. The ring pitch of the diffraction structure on the fourth surface is defined by the optical path difference function indicated in Table 9. This diffraction structure is provided for the objective lens such that a light beam with the 10th-order diffracted light exhibiting the maximum diffraction efficiency is caused to emerge with respect to a light beam of a wavelength λ3 (405 nm). This makes a light beam with 6th-order diffracted light exhibiting the maximum diffraction efficiency emerge with respect to a light beam of a wavelength λ1 (660 nm), and makes a light beam with 5th-order diffracted light exhibiting the maximum diffraction efficiency emerge with respect to a light beam of a wavelength λ2 (785 nm). In addition, the diffraction structure on the fourth surface has a function of suppressing a change in focal position due to small wavelength variations (several nm) of light beams of the respective wavelengths λ1, λ2, and λ3. In this arrangement, the light beam of the wavelength λ1 emitted from the objective lens forms a condensed light spot on the information recording surface of the first optical information recording medium (DVD), the light beam of the wavelength λ2 forms a condensed light spot on the information recording surface of the second optical information recording medium (CD), and the light beam of the wavelength λ3 forms a condensed light spot on the information recording surface of the third optical information recording medium (HD).

Owing to the diffraction effect of the first phase modulator formed on the first surface of the optical element 70, spherical aberration with respect to a light beam of the wavelength λ1 is corrected to allow the light beam of the wavelength λ1 to form a good condensed light spot on the information recording surface of the first optical information recording medium (DVD). Owing to the diffraction effect of the second phase modulator formed on the second surface of the optical element 70, spherical aberration with respect to a light beam of the wavelength λ2 is corrected to allow the light beam of the wavelength λ2 to form a good condensed light spot on the information recording surface of the second optical information recording medium (CD).

With this operation, when information is to be recorded on or played back from each optical information recording medium, the occurrence of aberration can be minimized even in the presence of the shift of the lens system including the objective lens due to tracking.

Tables 9 and 10 show the lens data of the optical element and objective lens used in the fourth embodiment. Table 11 shows the refractive indexes of the objective lens used in the fourth embodiment at the respective wavelengths.

TABLE 9 focal length: $f_3$ = 3.10 mm, $f_1$ = 3.19 mm, $f_2$ = 3.20 mm
numerical aperture: NA3 = 0.65, NA1 = 0.63, NA2 = 0.51
imaging magnification: m = 0.0, m = 0.0, m = 0.0

| $i^{th}$ Surface | Ri | di (405 nm) | di (660 nm) | di (785 nm) | Glass Material | |
|---|---|---|---|---|---|---|
| 0 | | ∞ | ∞ | ∞ | | |
| 1 | ∞ | 0.8 | 0.8 | 0.8 | A | diffraction surface |
| 2 | ∞ | 0.1 | 0.1 | 0.1 | Air (n = 1.0) | diffraction surface (0 ≦ h ≦ 1.63) |
| 2' | ∞ | 0.0 | 0.0 | 0.0 | — | (1.63 ≦ h) |
| 3 | ∞ | 0.0 | 0.0 | 0.0 | — | stop diameter: 4.03 mm |
| 4 | 1.98226 | 1.85 | 1.85 | 1.85 | B | aspherical surface/diffraction surface (serrated) |
| 5 | −8.94078 | 1.65949 | 1.72273 | 1.35045 | — | |
| 6 | ∞ | 0.6 | 0.6 | 1.2 | C | |
| 7 | ∞ | | | | | |

*d2' indicates change amount from second surface to second' surface in optical axis direction As shown in Table 9, the objective lens according to the fourth embodiment is designed such that when a light beam emitted from the first light source has the wavelength λ1=660 nm, focal length $f_1$=3.19 mm, image-side numerical aperture NA1=0.63, and imaging magnification m=0.0 are set, whereas when a light beam emitted from the second light source has the second wavelength λ2=785 nm, focal length $f_2$=3.20 mm, image-side numerical aperture NA2= 0.51, and imaging magnification m=0.0 are set. In addition, when a light beam emitted from the third light source has the third wavelength λ3=405 nm, focal length $f_3$=3.10 mm, image-side numerical aperture NA2=0.65, and imaging magnification m=0.0 are set.

In Table 9, the surface number 1 and the surface numbers 2 and 2' indicate the incident and exit surfaces of the optical element 70, respectively; the surface number 3, the stop; the surface numbers 4 and 5, the incident and exit surface of the objective lens, respectively; and the surface numbers 6 and 7, the surface of the protection substrate and the information recording surface of the protective substrate of the optical information recording medium.

TABLE 10

(Aspherical Surface/Diffraction Surface Data)

First Surface

Optical Path Difference Function Coefficient $B_2$: −1.4633E+00
$B_4$: −1.7553E−01
$B_6$: +1.4441E−03
$B_8$: −2.6492E−03

Second Surface (0 ≦ h ≦ 1.63 mm)

Optical Path Difference Function Coefficient $B_2$: −1.6475E+00
$B_4$: −4.6282E−01
$B_6$: −5.5967E−02

Fourth Surface

Aspherical Surface Coefficient

κ: −4.4997E−01
$A_4$: −5.0238E−04
$A_6$: −1.5160E−03
$A_8$: +5.2054E−04
$A_{10}$: −1.0572E−04
$A_{12}$: +1.0315E−05
$A_{14}$: −1.8725E−06

Optical Path Difference Function Coefficient $B_2$: −2.4094E+00
$B_4$: −1.2568E−01
$B_6$: −8.7391E−02
$B_8$: +1.7847E−02
$B_{10}$: −2.0930E−03

Fifth Surface

Aspherical Surface Coefficient

κ: −1.5007E+02
$A_4$: −9.6427E−03
$A_6$: +1.1600E−02
$A_8$: −5.3652E−03
$A_{10}$: +1.2630E−03
$A_{12}$: −1.5766E−04
$A_{14}$: +8.2088E−06

*Assume that the diffraction ring pitch given by the above optical path difference function is set, and a blazed wavelength is equivalent to 405 nm 10th-order diffracted light.

TABLE 11

| | (Refractive Indexes at Respective Wavelengths) | | |
|---|---|---|---|
| | 785 nm | 660 nm | 405 nm |
| A | 1.50324 | 1.50635 | 1.52439 |
| B | 1.50324 | 1.50635 | 1.52439 |
| C | 1.57063 | 1.57718 | 1.61869 |

Figure 20A:
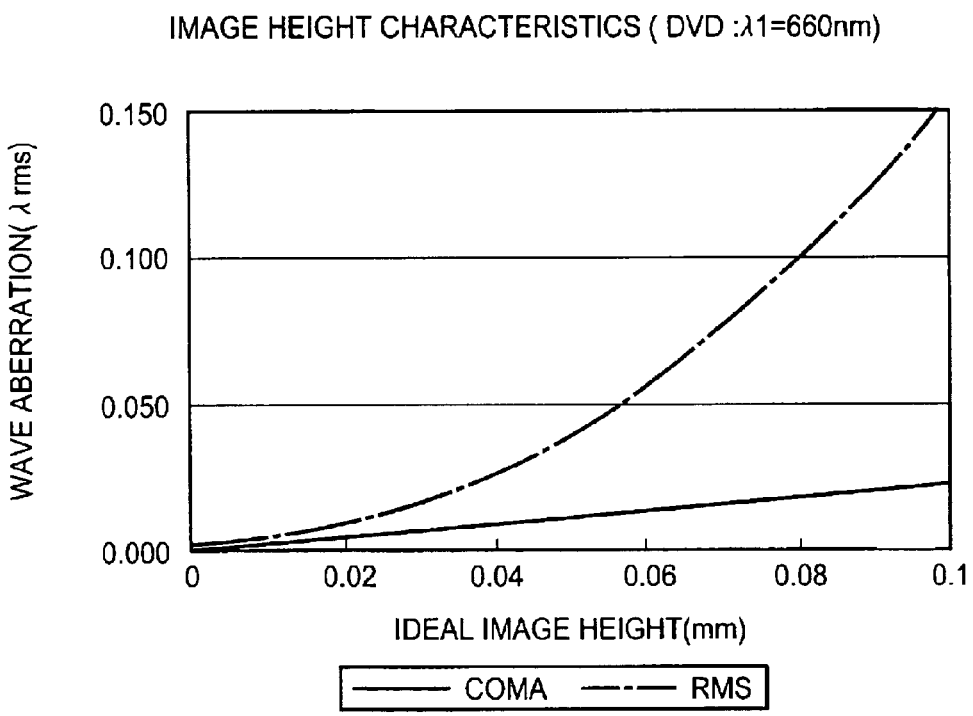
FIGS. 20A to 20C are graphs each showing the image height characteristics at the respective wavelengths in the fourth embodiment.
Figure 20B:
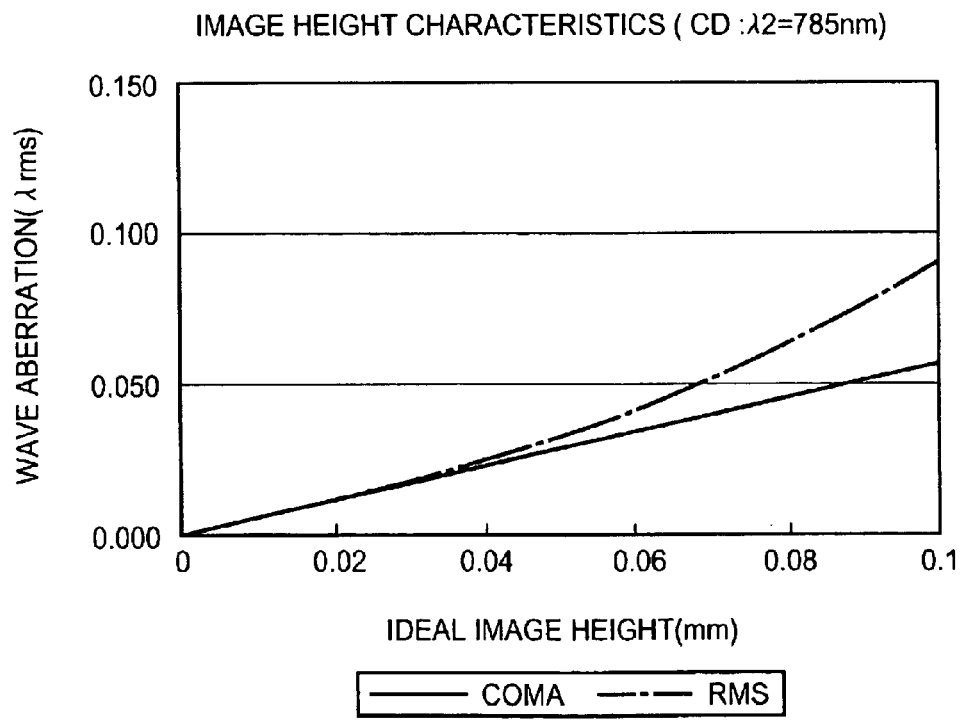
Figure 20C:
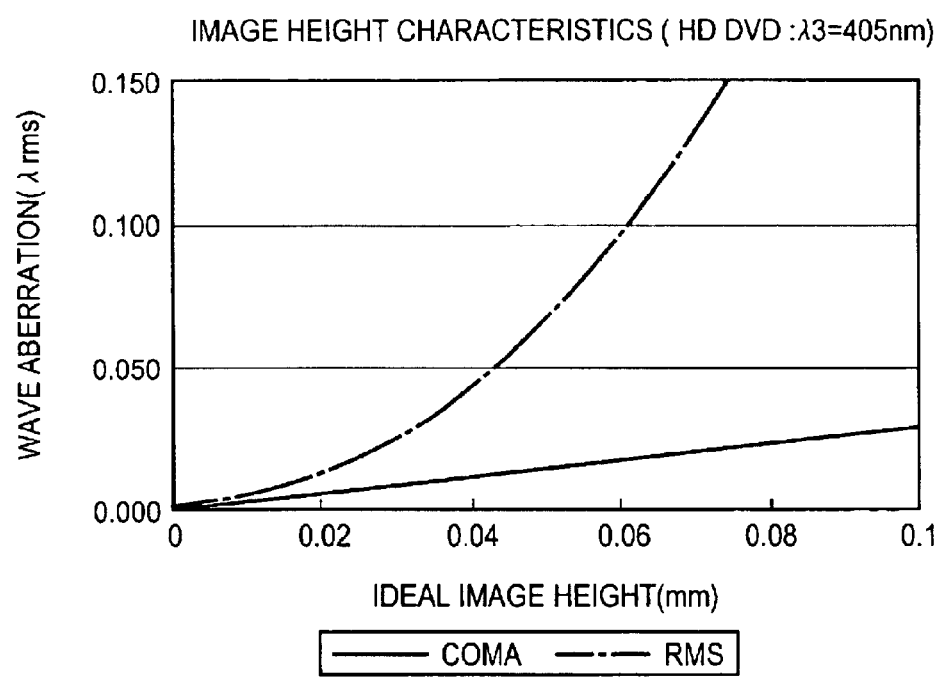

FIGS. 20A, 20B, and 20C are graphs respectively showing image height characteristics at the respective wavelengths (λ1 for DVDs, λ2 for CDs, and λ3 for HDs) in the fourth embodiment. In each graph, "COMA" indicates coma; and "RMS", the wave aberration obtained by adding spherical aberration, coma, and astigmatism.

As is understood from FIGS. 20A, 20B, and 20C, the optical system using the optical element 70 and objective lens 40 according to the fourth embodiment has good image height characteristics within an application range with respect to light beams of the wavelengths λ1, λ2, and λ3.

In each of the third and fourth embodiments, the optical element 70 is separately placed on the light source side of the objective lens 40, and the stop is placed between the objective lens 40 and the optical element 70. However, the optical element 70 may also be mounted on the actuator on which the objective lens 40 is mounted, and the objective lens 40 and optical element 70 may be joined to each other to be integrated into one unit. In this case, the objective lens 40 and optical element 70 can together constitute an objective lens system. It is more preferable that the objective lens 40 and optical element 70 are mounted together on the actuator and integrally driven. Obviously, the position of the stop is not limited to between the objective lens 40 and the optical element 70, and may be placed on the light source side of the optical element 70.

With regard to the objective lens used in each embodiment described above, the aspherical shapes of the light-source-side surface and image-side (recording-medium-side) surface and the pitch P of discontinuous parts (see FIG. 3) are obtained by equations (1) and (2) given below.

$$X(h) = \frac{(h^2/R)}{1 + \sqrt{1 - (1+\kappa)(h/R)^2}} + \sum_{i=2}^{7} A_{2i} h^{2i} \quad (1)$$

As described above, X(h) represents an axis in the optical axis direction (with the traveling direction of light being positive). In addition to the height h from the optical axis, the cone coefficient κ, and the radius of curvature R, an aspherical surface coefficient in the aspherical surface/diffraction surface data exemplified in each embodiment is substituted as $A_{2i}$ into equation (1) to form an aspherical surface axially symmetrical around the optical axis L.

$$\phi(h) = \sum_{i=1}^{5} B_{2i} h^{2i} \quad (2)$$

An optical path difference function coefficient $B_{2i}$ in the aspherical surface/diffraction surface data exemplified in each embodiment is substituted into equation (2).

Equation (3) given below represents the optical path difference of a light beam of the wavelength λ1 or λ2 at an arbitrary height from the optical axis. That is, equation (3) is a mathematical expression representing a wavelength difference given to each light beam by the first phase modulator and second phase modulator.

$$\Phi'(h) = -p * INT[M * MOD\{\Phi(h)\}] * \frac{\lambda_i}{\lambda} * \frac{n-1}{n_i - 1} \quad (3)$$

where p: predetermined integer (wavelength count provided by stepped portions)

INT: integral part of number

M: division count of diffraction rings (number of stepped portions)

MOD: fractional part of number h: height from optical axis

λ: operating wavelength $\lambda_i$: wavelength within λ2±30 nm (or λ3±30 nm) for first phase modulator, and wavelength within λ1±30 nm (or λ3±30 nm) for second phase modulator n: refractive index at operating wavelength $n_i$: refractive index at $\lambda_i$ Table 12 shows specific values of $\lambda_i$, p, and M.

TABLE 12

| Surface | First Embodiment | | Second Embodiment | | Third Embodiment | | Fourth Embodiment | |
|---|---|---|---|---|---|---|---|---|
| | 2nd surface | 3rd surface | 2nd, 2nd' surfaces | 3rd surface | 1st surface | 2nd surface | 1st surface | 2nd, 2nd' surface |
| $\lambda_i$ | 685 nm | 405 nm | 790 nm | 655 nm | 790 nm | 655 nm | 785 nm | 660 nm |
| P | −1 | −2 | −1 | −1 | −1 | 1 | −1 | 3 |
| M | 5 | 5 | 5 | 5 | 5 | 5 | 5 | 2. |

What is claimed is:

1. An optical pickup apparatus, comprising:
a first light source for emitting a first light beam having a first wavelength λ1 to reproduce and/or record information from or onto a first optical information recording medium having a first protective substrate of a first thickness t1;
a second light source for emitting a second light beam having a second wavelength λ2 (λ2>λ1) to reproduce and/or record information from or onto a second optical information recording medium having a second protective substrate of a second thickness t2 (t2≧t1);
a plurality of optical elements, each of the optical element having a plurality of optical surfaces, wherein the optical elements are arranged on a common optical path through which the first light beam and the second light beam pass;
a first phase modulator having discontinuous parts formed periodically and concentrically around an optical axis on at least one of the plurality of optical surfaces, each of the discontinuous parts being formed from a predetermined number of stepped portions, wherein the first phase modulator gives a diffraction effect only to the first light beam; and
a second phase modulator having discontinuous parts formed periodically and concentrically around an optical axis on at least one of the remaining optical surfaces, each of the discontinuous parts being formed from a predetermined number of stepped portions, wherein the second phase modulator gives a diffraction effect only to the second light beam.

2. The apparatus of claim 1, wherein
the stepped portions of the first phase modulator are designed to give a phase difference to the first light beam passing through each of the discontinuous parts of the first phase modulator and give no phase difference to the second light beam, and
the stepped portions of said second phase modulator are designed to give a phase difference to the second light beam passing through each of the discontinuous parts of the second phase modulator and give no phase difference to the first light beam.

3. The apparatus of claim 1, wherein the number of discontinuous parts of at least one of the first phase modulator and the second phase modulator falls within a range of 4 to 6.

4. The apparatus of claim 1, wherein
at least one of optical surfaces of the first phase modulator and the second phase modulator comprises at least two areas including a central area containing an optical axis and a peripheral area located on a periphery of the central area,
the first light beam passing through the central area is used to reproduce or record information from or on the first optical information recording medium,
the second light beam passing through the central area is used to reproduce or record information from or on the second optical information recording medium, and
the second light beam passing through the peripheral area is not used for reproducing or recording information from or on the second optical information recording medium and the first light beam passing through the peripheral area is used for reproducing or recording information from or on the first optical information recording medium, or the first light beam passing through the peripheral area is not used for reproducing or recording information from or on the first optical information recording medium and the second light beam passing the peripheral area is used for reproducing or recording from or on the second optical information recording medium.

5. The apparatus of claim 4, wherein both the optical surface having said first phase modulator and the optical surface having said second phase modulator comprise the at least two areas.

6. The apparatus of claim 4, wherein when the second light beam passing through the peripheral area is not used for reproducing or recording information from or on the second optical information recording medium, the second light beam passing through the peripheral area is condensed at a point other than an information recording surface of the second optical information recording medium, and when the first light beam passing through the peripheral area is not used for reproducing or recording information from or on the first optical information recording medium, the first light beam passing through the peripheral area is condensed at a point other than an information recording surface of the first optical information recording medium.

7. The apparatus of claim 1, wherein the first phase modulator means and the second phase modulator are formed on a single optical element of the plurality of optical elements.

8. The apparatus of claim 7, wherein the single optical element on which said first phase modulator and said second phase modulator are formed is an objective optical element.

9. The apparatus of claim 1, wherein at least one of the plurality of optical elements is an objective optical element, and an imaging magnification m1 of the single objective optical element with respect to the first light beam and an imaging magnification m2 of the single objective optical element with respect to the second light beam satisfy −0.005≦m1≦0.005

−0.005≦m2≦0.005.

10. The apparatus of claim 1, wherein at least one of the plurality of optical elements is an objective optical element, and an imaging magnification of the single objective optical element with respect to the first light beam is different from an imaging magnification of the single objective optical element with respect to the second light.

11. The apparatus of claim 1, wherein at least one of the plurality of optical elements is an objective optical element, the first light beam enters as infinite light on the objective optical element, and the second light beam enters as divergent light on the objective optical element.

12. The apparatus of claim 1, wherein at least one of the plurality of optical elements is an objective optical element, both the first light beam and the second light beam enters as finite light on the objective optical element.

13. The apparatus of claim 12, wherein an imaging magnification m1 of the single objective optical element with respect to the first light beam and an imaging magnification m2 of the single objective optical element with respect to the second light beam of satisfy $$-0.295 \leq m1 \leq -0.049$$

$$-0.295 \leq m2 \leq -0.049.$$

14. The apparatus of claim 1, wherein $$600 \text{ nm} \leq \lambda 1 \leq 700 \text{ nm}$$

$$750 \text{ nm} \leq \lambda 2 \leq 850 \text{ nm}$$

are satisfied.

15. The apparatus of claim 1, wherein $$350 \text{ nm} \leq \lambda 1 \leq 450 \text{ nm}$$

$$600 \text{ nm} \leq \lambda 2 \leq 700 \text{ nm}$$

are satisfied.

16. The apparatus of claim 1, wherein the optical surface having the first phase modulator is located closer to a light source side than the optical surface having the second phase modulator.

17. The apparatus of claim 1, wherein at least one of the first phase modulator and the second phase modulator acts to reduce spherical aberration on an information recording surface of an optical information recording medium by a change in ambient temperature.

18. The apparatus of claim 1, wherein at least one of the first phase modulator and the second phase modulator acts to reduce spherical aberration on an information recording surface of an optical information recording medium caused by a change in wavelength with respect to at least one of the first light beam and the second light beam.

19. The apparatus of claim 1, further comprising a third light source for emitting a third light beam of a third wavelength $\lambda 3$ ($\lambda 3 < \lambda 1$) to record and/or reproduce information from or onto a third optical information recording medium having a third protective substrate of a third thickness t3 ($t3 \leq t1$).

20. A condensing optical system for use in an optical pickup apparatus comprising:
a plurality of optical elements having a plurality of optical surfaces;
a first phase modulator having discontinuous parts formed periodically and concentrically around an optical axis on at least one of the plurality of optical surfaces, each of the discontinuous parts being formed from a predetermined number of stepped portions,
wherein in case that a first light beam having a first wavelength $\lambda 1$ for reproducing and/or recording information from or onto a first optical information recording medium having a first protective substrate of a first thickness t1 and a second light beam having a second wavelength $\lambda 2$ ($\lambda 2 > \lambda 1$) for recording and/or reproducing information form or onto a second optical information recording medium having a second protective substrate of a second thickness t2 ($t2 \geq t1$), pass through the first phase modulator, the first phase modulator gives a diffraction effect only to the first light beam; and
a second phase modulator having discontinuous parts formed periodically and concentrically around an optical axis on at least one of the remaining optical surfaces, each of the discontinuous parts being formed from a predetermined number of stepped portion,
wherein in case that the first light beam and the second light beam pass through the second phase modulator, the second phase modulator gives a diffraction effect only to the second light beam;
wherein the plurality of optical elements are arranged on a common optical path in the optical pickup apparatus through which the first light beam and the second light beam pass.

21. The system of claim 20, wherein
the stepped portions of the first phase modulator are designed to give a phase difference to the first light beam passing through each of the discontinuous parts of the first phase modulator and give no phase difference to the second light beam, and
the stepped portions of said second phase modulator are designed to give a phase difference to the second light beam passing through each of the discontinuous parts of the second phase modulator and give no phase difference to the light beam of the wavelength $\lambda 1$.

22. The system of claim 20, wherein the number of discontinuous parts of at least one of the first phase modulator and the second phase modulator falls within a range of 4 to 6.

23. The system of claim 20, wherein
at least one of optical surfaces of the first phase modulator and the second phase modulator comprises at least two areas including a central area containing an optical axis and a peripheral area located on a periphery of the central area,
the first light beam passing through the central area is used to reproduce or record information from or on the first optical information recording medium,
the second light beam passing through the central area is used to reproduce or record information from or on the second optical information recording medium, and
the second light beam passing through the peripheral area is not used for reproducing or recording information from or on the second optical information recording medium and the first light beam passing through the peripheral area is used for reproducing or recording information from or on the first optical information recording medium, or the first light beam passing through the peripheral area is not used for reproducing or recording information from or on the first optical information recording medium and the second light beam passing the peripheral area is used for reproducing or recording from or on the second optical information recording medium.

24. The system of claim 23, wherein both the optical surface having said first phase modulator and the optical surface having said second phase modulator comprise the at least two areas.

25. The system of claim 23, wherein when the second light beam passing through the peripheral area is not used for reproducing or recording information from or on the second optical information recording medium, the second light beam passing through the peripheral area is condensed at a point other than an information recording surface of the second optical information recording medium, and when the first light beam passing through the peripheral area is not used for reproducing or recording information from or on the first optical information recording medium, the first light beam passing through the peripheral area is condensed at a point other than an information recording surface of the first optical information recording medium.

26. The system of claim 20, wherein the first phase modulator and the second phase modulator are formed on a single optical element of the plurality of optical elements.

27. The system of claim 26, wherein the single optical element on which said first phase modulator and said second phase modulator are formed is an objective optical element for the optical pickup apparatus.

28. The system of claim 20, wherein 600 nm≦λ1≦700 nm 750 nm≦λ2≦850 nm are satisfied.

29. The system of claim 20, wherein 350 nm≦λ1≦450 nm 600 nm≦λ2≦700 nm are satisfied.

30. The system of claim 20, wherein the optical surface having the first phase modulator is located closer to a light source side than the optical surface having the second phase modulator.

31. The system of claim 20, wherein at least one of the first phase modulator and the second phase modulator acts to reduce spherical aberration on an information recording surface of an optical information recording medium by a change in ambient temperature.

32. The system of claim 20, wherein at least one of the first phase modulator and the second phase modulator acts to reduce spherical aberration on an information recording surface of an optical information recording medium caused by a change in wavelength with respect to at least one of the first light beam and the second light beam.

33. The system of claim 20, wherein the optical pickup apparatus further comprises a third light source for emitting a third light beam of a third wavelength λ3 (λ3<λ1) to record and/or reproduce information from or onto a third optical information recording medium having a third protective substrate of a third thickness t3 (t3≦t1).

34. An optical element for use in an optical pickup apparatus for recording and/or reproducing information from or onto an optical information recording medium, comprising:
    a first phase modulator formed on one optical surface, for giving a diffraction effect,
    wherein in case that a first light beam having a first wavelength λ1 for reproducing and/or recording information from or onto a first optical information recording medium having a first protective substrate of a first thickness t1 and a second light beam having a second wavelength λ2 (λ2>λ1) for recording and/or reproducing information form or onto a second optical information recording medium having a second protective substrate of a second thickness t2 (t2≧t1), pass through the first phase modulator, the first phase modulator gives the diffraction effect only to the first light beam; and
    a second phase modulator formed on the other optical surface, for giving a diffraction effect,
    wherein in case that the first light beam and the second light beam pass through the second phase modulator the second phase modulator gives the diffraction effect only to the second light beam;
    wherein the optical element is arranged on a common optical path in the optical pickup apparatus through which the first light beam and the second light beam pass.

35. An element of claim 34, wherein
    the first phase modulator has discontinuous parts formed periodically and concentrically around an optical axis on the one optical surface, each of the discontinuous parts being formed from a predetermined number of stepped portions,
    a second phase modulator having discontinuous parts formed periodically and concentrically around an optical axis on the other optical surface, each of the discontinuous parts being formed from a predetermined number of stepped portions,
    the stepped portions of the first phase modulator are designed to give a phase difference to the first light passing through each of the discontinuous parts of the first phase modulator and give no phase difference to the second light beam, and
    the stepped portions of said second phase modulator are designed to give a phase difference to the second light beam passing through each of the discontinuous parts of the second phase modulator and give no phase difference to the light beam of the wavelength λ1.

36. The element of claim 34, wherein the number of discontinuous parts of at least one of the first phase modulator and the second phase modulator falls within a range of 4 to 6.

37. The element of claim 34, wherein
    at least one of optical surfaces of the first phase modulator and the second phase modulator comprises at least two areas including a central area containing an optical axis and a peripheral area located on a periphery of the central area,
    the first light beam passing through the central area is used to reproduce or record information from or on the first optical information recording medium,
    the second light beam passing through the central area is used to reproduce or record information from or on the second optical information recording medium, and
    the second light beam passing through the peripheral area is not used for reproducing or recording information from or on the second optical information recording medium and the first light beam passing through the peripheral area is used for reproducing or recording information from or on the first optical information recording medium, or the first light beam passing through the peripheral area is not used for reproducing or recording information from or on the first optical information recording medium and the second light beam passing the peripheral area is used for reproducing or recording from or on the second optical information recording medium.

38. The element of claim 37, wherein both the optical surface having said first phase modulator and the optical surface having said second phase modulator comprise the at least two areas.

39. The element of claim 37, wherein when the second light beam passing through the peripheral area is not used for reproducing or recording information from or on the second optical information recording medium, the second light beam passing through the peripheral area is condensed at a point other than an information recording surface of the second optical information recording medium, and when the first light beam passing through the peripheral area is not used for reproducing or recording information from or on the first optical information recording medium, the first light beam passing through the peripheral area is condensed at a point other than an information recording surface of the first optical information recording medium.

40. The element of claim 34, wherein the optical element is an objective optical element for the optical pickup apparatus.

41. The element of claim 34, wherein 600 nm$\leq \lambda 1 \leq$700 nm 750 nm$\leq \lambda 2 \leq$850 nm are satisfied.

42. An element of claim 34, wherein 350 nm$\leq \lambda 1 \leq$450 nm 600 nm$\leq \lambda 1 \leq$700 nm are satisfied.

43. The element of claim 34, wherein the optical surface having the first phase modulator is located closer to a light source side than the optical surface having the second phase modulator.

44. The element of claim 34, wherein at least one of the first phase modulator and the second phase modulator acts to reduce spherical aberration on an information recording surface of an optical information recording medium caused by a change in ambient temperature.

45. The element of claim 34, wherein at least one of the first phase modulator and the second phase modulator acts to reduce spherical aberration on an information recording surface of an optical information recording medium caused by a change in wavelength with respect to at least one of the first light beam and the second light beam.

46. An element of claim 34, wherein the optical pickup apparatus further comprises a third light source for emitting a third light beam of a third wavelength $\lambda 3$ ($\lambda 3<\lambda 1$) to record and/or reproduce information from or onto a third optical information recording medium having a third protective substrate of a third thickness t3 ($t3 \leq t1$).

* * * * *